(12) United States Patent
Miyajima et al.

(10) Patent No.: US 10,682,625 B2
(45) Date of Patent: Jun. 16, 2020

(54) ABSORBENT RESIN COMPOSITION AND METHOD FOR PRODUCING SAME

(71) Applicant: SDP Global Co., Ltd., Tokyo (JP)

(72) Inventors: Toru Miyajima, Tokyo (JP); Yusuke Matsubara, Tokyo (JP); Taichi Matsuyama, Tokyo (JP); Shoichi Hirooka, Tokyo (JP)

(73) Assignee: SDP Global Co., Ltd., Tokyo (JP)

( * ) Notice: Subject to any disclaimer, the term of this patent is extended or adjusted under 35 U.S.C. 154(b) by 0 days.

(21) Appl. No.: 15/764,997

(22) PCT Filed: Sep. 30, 2016

(86) PCT No.: PCT/JP2016/079085
§ 371 (c)(1),
(2) Date: Mar. 30, 2018

(87) PCT Pub. No.: WO2017/057709
PCT Pub. Date: Apr. 6, 2017

(65) Prior Publication Data
US 2018/0318792 A1    Nov. 8, 2018

(30) Foreign Application Priority Data

Oct. 2, 2015  (JP) ................. 2015-196601
Dec. 4, 2015  (JP) ................. 2015-237626

(51) Int. Cl.
| | | |
|---|---|---|
| B01J 20/26 | (2006.01) | |
| C08K 3/30 | (2006.01) | |
| C08L 33/14 | (2006.01) | |
| C08L 33/02 | (2006.01) | |
| C08K 3/00 | (2018.01) | |
| B01J 20/32 | (2006.01) | |
| B01J 20/28 | (2006.01) | |

(52) U.S. Cl.
CPC ........... B01J 20/267 (2013.01); B01J 20/261 (2013.01); B01J 20/28047 (2013.01); B01J 20/321 (2013.01); C08K 3/00 (2013.01); C08K 3/30 (2013.01); C08L 33/02 (2013.01); C08L 33/14 (2013.01); B01J 2220/68 (2013.01)

(58) Field of Classification Search
None
See application file for complete search history.

(56) References Cited

U.S. PATENT DOCUMENTS

| | | |
|---|---|---|
| 5,382,610 A | 1/1995 | Harada et al. |
| 6,258,996 B1 | 7/2001 | Goldman |
| 6,380,456 B1 | 4/2002 | Goldman |
| 2008/0114129 A1 | 5/2008 | Herfert et al. |
| 2008/0187755 A1 | 8/2008 | Herfert et al. |
| 2008/0221237 A1 | 9/2008 | Herfert et al. |
| 2009/0204087 A1 | 8/2009 | Herfert et al. |
| 2010/0063469 A1 | 3/2010 | Herfert |
| 2011/0095227 A1 | 4/2011 | Herth et al. |
| 2011/0114881 A1 | 5/2011 | Torii et al. |
| 2011/0224361 A1 | 9/2011 | Daniel et al. |
| 2012/0258851 A1 | 10/2012 | Nakatsuru et al. |
| 2013/0175473 A1 | 7/2013 | Wada et al. |

FOREIGN PATENT DOCUMENTS

| | | | |
|---|---|---|---|
| EP | 2623198 A1 | | 8/2013 |
| JP | 48-19632 A | | 3/1973 |
| JP | 51-136588 A | | 11/1976 |
| JP | 53-046389 A | | 4/1978 |
| JP | 53-078288 A | | 7/1978 |
| JP | 53-78288 A | | 7/1978 |
| JP | 55-133413 A | | 10/1980 |
| JP | 56-026909 A | | 3/1981 |
| JP | 58-180233 A | | 10/1983 |
| JP | 59-189103 A | | 10/1984 |
| JP | 61-16903 A | | 1/1986 |
| JP | 61-211305 A | | 9/1986 |
| JP | 61-257235 A | | 11/1986 |
| JP | 62-112654 | * | 5/1987 |
| JP | 05-031362 A | | 9/1993 |
| JP | 11-240959 A | | 7/1999 |
| JP | 2003-165883 A | | 6/2003 |
| JP | 2003-225565 A | | 8/2003 |
| JP | 2005-075982 A | | 3/2005 |

(Continued)

OTHER PUBLICATIONS

International Search Report dated Dec. 13, 2016, issued for PCT/JP2016/079085.

(Continued)

*Primary Examiner* — Tanisha Diggs
(74) *Attorney, Agent, or Firm* — Locke Lord LLP

(57) ABSTRACT

Provided is an absorbent resin composition which has both improved absorbency under load and improved liquid permeability between swollen gels, which is free from blocking or discoloration during storage, and which does not generate any odors. The present invention is an absorbent resin composition containing: a crosslinked polymer (A) including, as an essential structural units, a crosslinking agent (b) and a water-soluble vinyl monomer (a1) and/or a vinyl monomer (a2) which produces the water-soluble vinyl monomer (a1) through hydrolysis; and a cationic organic polymer (c) having a number average molecular weight of 1,000,000 or higher, or a cationic organic polymer (B) that has a cationic group and that is obtained through polymerization of a monomer composition including, as essential components, a cationic monomer having an amino group (am) and/or a cationic monomer having a salt of an amino group (am).

8 Claims, 2 Drawing Sheets

(56) References Cited

FOREIGN PATENT DOCUMENTS

| | | |
|---|---|---|
| JP | 2005-095759 A | 4/2005 |
| JP | 3648553 B2 | 5/2005 |
| JP | 2006-131767 A | 5/2006 |
| JP | 4261636 B2 | 4/2009 |
| JP | 2010-501698 A | 1/2010 |
| JP | 2010-540207 A | 12/2010 |
| JP | 2012-161788 A | 8/2012 |
| JP | 2013-133399 A | 7/2013 |
| JP | 2014-512440 A | 5/2014 |
| WO | 1992/00108 A1 | 1/1992 |
| WO | 1998/037149 A1 | 8/1998 |
| WO | 2006/082188 A1 | 8/2006 |
| WO | 2006/082189 A1 | 8/2006 |
| WO | 2006/082197 A1 | 8/2006 |
| WO | 2008/025652 A1 | 3/2008 |
| WO | 2008/025656 A1 | 3/2008 |
| WO | 2011/078298 A1 | 6/2011 |
| WO | 2012/043821 A1 | 4/2012 |

OTHER PUBLICATIONS

Supplementary European Search Report dated Apr. 1, 2019, issued for the European patent application No. 16 85 1878.5.
Supplementary European Search Report dated May 21, 2019, issued for the counter-part EP Application No. 16851878.5.
Communication pursuant to Rule 114(2) EPC dated Jun. 17, 2019, including a third party observations filed with respect to the counter-part EP patent application No. 16851878.5.

* cited by examiner

ABSORBENT RESIN COMPOSITION AND METHOD FOR PRODUCING SAME

CROSS REFERENCE TO RELATED APPLICATIONS

This application is related to co-pending application: "WATER ABSORBENT RESIN PARTICLES AND METHOD FOR PRODUCING SAME" filed even date herewith in the names of Yusuke MATSUBARA and Toru MIYAJIMA as a national phase entry of PCT/JP2016/079081, which application is assigned to the assignee of the present application and is incorporated by reference herein.

TECHNICAL FIELD

The present invention relates to a water-absorbent resin composition and a method for the production thereof. Particularly, it relates to a water-absorbent resin composition that exhibits high liquid permeability between swollen gels and a method for producing the same.

BACKGROUND ART

Currently, water-absorbent resins produced mainly from hydrophilic fiber such as pulp and acrylic acid (salt) are widely utilized as absorbents for sanitary materials such as disposable diapers, sanitary napkins, and incontinence pads. From the viewpoint of improvement in recent QOL (quality of life), demand for such sanitary materials are shifting to those of lighter weight or of smaller thickness, and following this tendency, reduction of hydrophilic fiber usage has been demanded. Therefore, water-absorbent resin itself has been demanded to play the role of liquid diffusibility or initial absorption in an absorbent which have been taken by hydrophilic fibers, and water-absorbent resins superior in both liquid absorption under load and liquid permeability between swollen gels have been needed.

As a method for improving liquid permeability between swollen gels, there have been known (1) a method of forming physical spaces by adding an inorganic compound such as silica and talc to a surface of a water-absorbent resin, (2) a method of forming gel gaps by suppressing adhesion of swollen gels by treating a surface of a water-absorbent resin with a hydrophobic polymer small in surface free energy, such as modified silicone, and (3) a method of adding aluminum sulfate, aluminum lactate, etc. to a surface of a water-absorbent resin (see, for example, Patent Document 1, Patent Document 2, and Patent Document 3). However, the liquid permeability between swollen gels achieved by these methods are not fully satisfactory.

As another technique to improve liquid permeability between swollen gels, a technique of coating the surface of water-absorbent resin particles with a water-soluble polyamine, such as polyethyleneimine and polyvinylamine, has already been known (see, for example, Patent Document 4). However, the technique disclosed in Patent Document 4 allowed resin particles to adhere each other during coating, so that it was impossible to perform uniform coating. Therefore, it is impossible to sufficiently improve liquid permeability between swollen gels and, in addition, there is a problem that blocking or discoloration due to moisture absorption during storage is prone to occur and an unpleasant odor is generated.

PRIOR ART DOCUMENTS

Patent Documents

Patent Document 1: JP-A-2012-161788
Patent Document 2: JP-A-2013-133399
Patent Document 3: JP-A-2014-512440
Patent Document 4: JP-A-2010-501698

SUMMARY OF THE INVENTION

Problems to be Solved by the Invention

The object of the present invention is to provide a water-absorbent resin composition that has sufficient water retention capacity and that is capable of improving both liquid absorption under load and liquid permeability between swollen gels and that does not have blocking or discoloration during its storage and does not have generation of odor.

Solutions to the Problems

That is, the first present invention provides a water-absorbent resin composition comprising a crosslinked polymer (A) comprising, as essential constitutional units, a water-soluble vinyl monomer (a1) and/or a vinyl monomer (a2) that turns into a water-soluble vinyl monomer (a1) through hydrolysis, and a crosslinking agent (b); and a cationic organic polymer (c) having a number average molecular weight of 1,000,000 or more; and a method for producing a water-absorbent resin composition, comprising a step of mixing a crosslinked polymer (A) comprising, as essential constitutional units, a water-soluble vinyl monomer (a1) and/or a vinyl monomer (a2) that turns into a water-soluble vinyl monomer (a1) through hydrolysis, and a crosslinking agent (b) with an in-oil dispersion of a cationic organic polymer (c) having a number average molecular weight of 1,000,000 or more.

The second present invention provides a water-absorbent resin composition comprising a crosslinked polymer (A) comprising, as essential constitutional units, a water-soluble vinyl monomer (a1) and/or a vinyl monomer (a2) that turns into a water-soluble vinyl monomer (a1) through hydrolysis and a crosslinking agent (b); and a cationic organic polymer (B) having a cationic group that is a salt of at least one amino group (am) selected from the group consisting of a —$NH_2$ group, a mono-alkyl (having 1 to 4 carbon atoms)-substituted —$NH_2$ group, and a di-alkyl (having 1 to 4 carbon atoms)-substituted —$NH_2$ group, wherein the cationic organic polymer (B) is a polymer or a salt thereof of a monomer composition comprising, as essential constituents, a cationic monomer having the amino group (am) and/or a cationic monomer having a salt of the amino group (am), and wherein the ratio of the cationic monomer contained in the monomer composition is 50 mol % or more based on the total number of moles of the monomers contained in the monomer composition; and a method for producing a water-absorbent resin composition, comprising a step of mixing the crosslinked polymer (A) with an aqueous solution of a cationic organic polymer (B').

Advantages of the Invention

The water-absorbent resin composition of the present invention (hereinafter, also referred to as the present invention without distinguishing the first present invention and the second present invention) and a water-absorbent resin composition obtained by the production method of the present invention have sufficient water retention capacity and are superior in both liquid absorption under load and liquid permeability between swollen gels. The compositions are also superior in handling properties during their production. Moreover, they do not have occurrence of blocking, discoloration, or odor due to moisture absorption during storage. Therefore, they stably exert excellent absorption performance (e.g., liquid diffusibility, absorption rate, and the amount of absorption) even under various use conditions.

MODE FOR CARRYING OUT THE INVENTION

Figure 1:
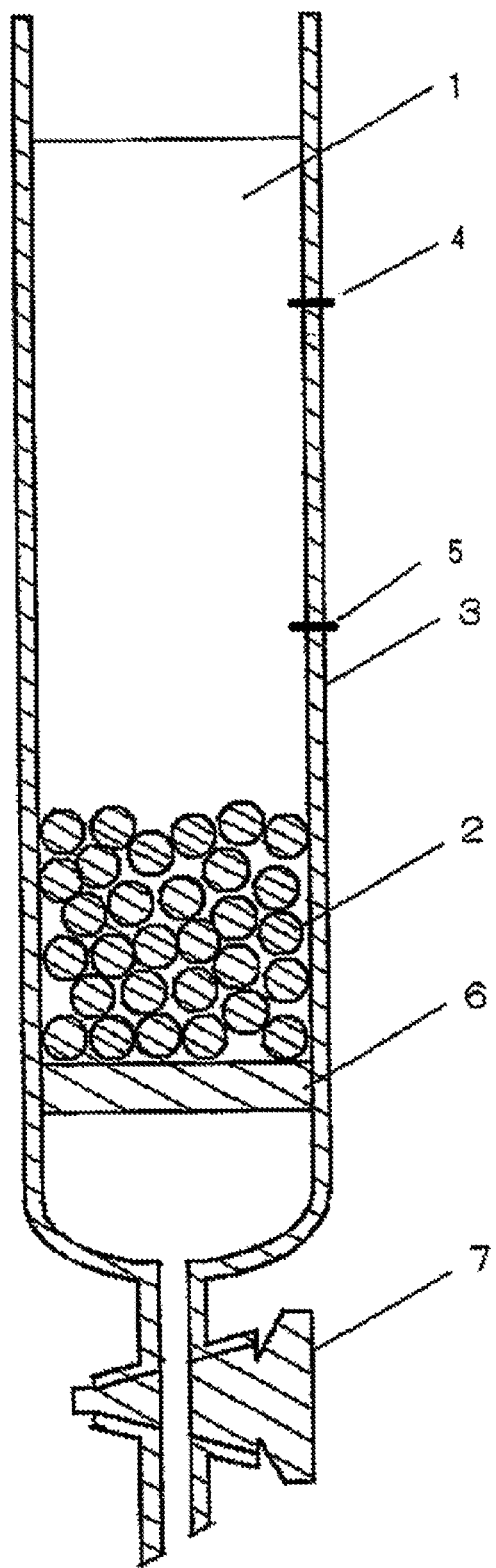
FIG. 1 is a drawing schematically illustrating a cross-sectional view of a filtration cylinder for measuring a gel liquid permeation rate.

Hereinafter, when referring to "the present invention," matters common to the first present invention and the second present invention are explained. On the other hand, a matter unique to the first present invention and a matter unique to the second present invention are each explained with clearly stating so.

The water-absorbent resin composition of the present invention is a water-absorbent resin composition comprising a crosslinked polymer (A) comprising, as essential constitutional units, a water-soluble vinyl monomer (a1) and/or a vinyl monomer (a2) that turns into a water-soluble vinyl monomer (a1) through hydrolysis, and a crosslinking agent (b); and a cationic organic polymer.

The water-soluble vinyl monomer (a1) as used in the present invention is not particularly limited, and there can be used such conventional monomers as vinyl monomers having at least one water-soluble substituent and an ethylenically unsaturated group disclosed in paragraphs 0007 to 0023 of Japanese Patent No. 3648553 (e.g., anionic vinyl monomers, nonionic vinyl monomers, and cationic vinyl monomers), the anionic vinyl monomers, nonionic vinyl monomers and cationic vinyl monomers disclosed in paragraphs 0009 to 0024 of JP-A-2003-165883, and vinyl monomers having at least one group selected from the group consisting of a carboxy group, a sulfo group, a phosphono group, a hydroxy group, a carbamoyl group, an amino group, and an ammonio group disclosed in paragraphs 0041 to 0051 of JP-A-2005-75982.

The vinyl monomer (a2) that turns into a water-soluble vinyl monomer (a1) through hydrolysis [hereinafter, also referred to as hydrolyzable vinyl monomer (a2)] is not particularly limited, and there can be used such conventional vinyl monomers as vinyl monomers having at least one hydrolyzable substituent that turns into a water-soluble substituent through hydrolysis disclosed in paragraphs 0024 to 0025 of Japanese Patent No. 3648553, and vinyl monomers having at least one hydrolyzable substituent [e.g., a 1,3-oxo-2-oxapropylene (—CO—O—CO—) group, an acyl group, and a cyano group] disclosed in paragraphs 0052 to 0055 of JP-A-2005-75982. While water-soluble vinyl monomer is a concept well known to those skilled in the art, it numerically means, for example, a vinyl monomer soluble in an amount of at least 100 g in 100 g of water at 25° C. While hydrolyzability with the hydrolyzable vinyl monomer (a2) is a concept well known to those skilled in the art, it specifically means, for example, a property to be hydrolyzed by the action of water and, according to need, of a catalyst (e.g., an acid or a base), thereby becoming water-soluble. Although the hydrolysis of the hydrolyzable vinyl monomer (a2) may be carried out during polymerization, after polymerization, or both during and after polymerization, after polymerization is preferred from the viewpoint of the absorption performance of water-absorbent resin composition to be obtained.

Of these, preferred from the viewpoint of absorption performance and the like is the water-soluble vinyl monomer (a1); more preferred are the above-described anionic vinyl monomer and vinyl monomers having a carboxy (salt) group, a sulfo (salt) group, an amino group, a carbamoyl group, an ammonio group, or a mono-, di-, or tri-alkylammonio group; even more preferred are vinyl monomers having a carboxy (salt) group or a carbamoyl group; particularly preferred are a (meth)acrylic acid (salt) and (meth)acrylamide; still particularly preferred are (meth)acrylic acid (salt); and most preferred are acrylic acid (salt).

The "carboxy (salt) group" means a "carboxy group" or a "carboxylate group", and the "sulfo (salt) group" means a "sulfo group" or a "sulfonate group." The (meth)acrylic acid (salt) means acrylic acid, a salt of acrylic acid, methacrylic acid, or a salt of methacrylic acid and the (meth)acrylamide means acrylamide or methacrylamide. Examples of such salts include salts of alkali metal (lithium, sodium, potassium, etc.), salts of alkaline earth metal (magnesium, calcium, etc.), and ammonium ($NH_4$) salts. Among these salts, salts of alkali metals and ammonium salts are preferred from the viewpoint of absorption performance and the like, salts of alkali metals are more preferred, and sodium salts are particularly preferred.

When one of a water-soluble vinyl monomer (a1) and a hydrolyzable vinyl monomer (a2) is contained as a constitutional unit, a single species of each of the monomers may be contained as a constitutional unit or, alternatively, two or more species may be contained as constitutional units, according to need. The same also applies to the case where both a water-soluble vinyl monomer (a1) and a hydrolyzable vinyl monomer (a2) are contained as constitutional units. When both the water-soluble vinyl monomer (a1) and the hydrolyzable vinyl monomer (a2) are contained as constitutional units, their contained molar ratio [(a1)/(a2)] is preferably from 75/25 to 99/1, more preferably from 85/15 to 95/5, particularly preferably from 90/10 to 93/7, and most preferably from 91/9 to 92/8. Within such ranges, further improved absorption performance is achieved.

In addition to the water-soluble vinyl monomer (a1) and the hydrolyzable vinyl monomer (a2), an additional vinyl monomer (a3) copolymerizable with them can be contained as a constitutional unit of the crosslinked polymer (A). The additional vinyl monomer (a3) may be used singly or two or more of the same may be used in combination.

The additional copolymerizable vinyl monomer (a3) is not particularly limited and conventional hydrophobic vinyl monomers (e.g., hydrophobic vinyl monomers disclosed in paragraphs 0028 to 0029 of Japanese Patent No. 3648553, vinyl monomers disclosed in paragraph 0025 of JP-A-2003-165883 and paragraph 0058 of JP-A-2005-75982) can be used, and specifically, for example, the following vinyl monomers (i) to (iii) can be used.

(i) Aromatic Ethylenic Monomers Having 8 to 30 Carbon Atoms

Styrenes, such as styrene, α-methylstyrene, vinyltoluene, and hydroxystyrene, vinylnaphthalene, and halogenated forms of styrene, such as dichlorostyrene, etc.

(ii) Aliphatic Ethylenic Monomers Having 2 to 20 Carbon Atoms

Alkenes (e.g., ethylene, propylene, butene, isobutylene, pentene, heptene, diisobutylene, octene, dodecene, and octadecene), and alkadienes (e.g., butadiene and isoprene), etc.

(iii) Alicyclic Ethylenic Monomers Having 5 to 15 Carbon Atoms

Monoethylenically unsaturated monomers (e.g., pinene, limonene, and indene); and polyethylenic vinyl monomers (e.g., cyclopentadiene, bicyclopentadiene, and ethylidene norbornene), etc.

From the viewpoint of absorption performance and the like, the content (mol %) of the additional vinyl monomer (a3) unit, based on the total number of moles of the water-soluble vinyl monomer (a1) unit and the hydrolyzable vinyl monomer (a2) unit, is preferably 0 to 5, more preferably 0 to 3, even more preferably 0 to 2, and particularly preferably 0 to 1.5, and from the viewpoint of absorption performance and the like, the content of the additional vinyl monomer (a3) is most preferably 0 mol %.

The crosslinking agent (b) is not particularly limited, and conventional crosslinking agents (e.g., crosslinking agents having two or more ethylenically unsaturated groups, crosslinking agents having at least one functional group capable of reacting with a water-soluble substituent and having at least one ethylenically unsaturated group and crosslinking agents having at least two functional groups each capable of reacting a water-soluble substituent disclosed in paragraphs 0031 to 0034 of Japanese Patent No. 3648553, crosslinking agents having two or more ethylenically unsaturated groups, crosslinking agents having an ethylenically unsaturated group and a reactive functional group and crosslinking agents having two or more reactive substituents disclosed in paragraphs 0028 to 0031 of JP-A-2003-165883, crosslinkable vinyl monomers disclosed in paragraph 0059 of JP-A-2005-75982 and crosslinkable vinyl monomers disclosed in paragraphs 0015 to 0016 of JP-A-2005-95759) can be used. Among these, from the viewpoint of absorption performance and the like, crosslinking agents having two or more ethylenically unsaturated groups are preferred; triallyl cyanurate, triallyl isocyanurate, and poly(meth)allyl ethers of polyols having 2 to 40 carbon atoms are more preferred; triallyl cyanurate, triallyl isocyanurate, tetraallyloxyethane, polyethylene glycol diallyl ether, and pentaerythritol triallyl ether are particularly preferred; and pentaerythritol triallyl ether is most preferred. The crosslinking agent (b) may be used singly or two or more of the same may be used in combination.

The content (mol %) of the crosslinking agent (b) units is preferably 0.001 to 5, more preferably 0.005 to 3, and particularly preferably 0.01 to 1 based on the total number of moles of the water-soluble vinyl monomer (a1) units and the hydrolyzable vinyl monomer (a2) units or, in the case where the additional vinyl monomer (a3) is used as well, the total number of moles of (a1) to (a3). Within such ranges, the absorption performance is further improved.

Examples of the method of polymerization of the crosslinked polymer (A) include conventional solution polymerization (adiabatic polymerization, thin film polymerization, and spray polymerization, etc.; JP-A-55-133413, etc.) and conventional reverse phase suspension polymerization (JP-B-54-30710, JP-A-56-26909, JP-A-1-5808, etc.).

Although the crosslinked polymer (A) can be obtained by polymerizing a monomer composition comprising, as essential constituents, a water-soluble vinyl monomer (a1) and/or a hydrolyzable vinyl monomer (a2), and a crosslinking agent (b), preferred as a polymerization method is a solution polymerization method, and the aqueous solution polymerization method is particularly preferred because it does not need use of an organic solvent, etc. and it is advantageous in production cost aspect, and an adiabatic aqueous solution polymerization method is most preferred in that a water-absorbent resin composition having a large water retention capacity and a small amount of water-soluble components is obtained and the temperature control during polymerization is unnecessary.

When performing aqueous solution polymerization, a mixed solvent comprising water and an organic solvent can be used, and examples of the organic solvent include methanol, ethanol, acetone, methyl ethyl ketone, N,N-dimethylformamide, dimethyl sulfoxide, and mixtures of two or more thereof.

When performing aqueous solution polymerization, the amount (% by weight) of an organic solvent used is preferably 40 or less, and more preferably 30 or less, based on the weight of water.

When using an initiator for polymerization, a conventional initiator for radical polymerization can be used and examples thereof include azo compounds [e.g., azobisisobutyronitrile, azobiscyanovaleric acid, and 2,2'-azobis(2-amidinopropane) hydrochloride], inorganic peroxides (e.g., hydrogen peroxide, ammonium persulfate, potassium persulfate, and sodium persulfate), organic peroxides [e.g., benzoyl peroxide, di-tert-butyl peroxide, cumene hydroperoxide, succinic acid peroxide, and di(2-ethoxyethyl) peroxydicarbonate], and redox catalysts (combinations of a reducing agent such as alkali metal sulfite or bisulfite, ammonium sulfite, ammonium bisulfite and ascorbic acid, and an oxidizing agent such as alkali metal persulfates, ammonium persulfate, hydrogen peroxide, and organic peroxides. These catalysts may be used singly and two or more species thereof may be used in combination.

The amount (% by weight) of the radical polymerization initiator used is preferably 0.0005 to 5, and more preferably 0.001 to 2, based on the total weight of the water-soluble vinyl monomer (a1) and the hydrolyzable vinyl monomer (a2).

In polymerization, a polymerization controlling agent represented by a chain transfer agent may be used together according to need, and specific examples thereof include sodium hypophosphite, sodium phosphite, alkylmercaptans, alkyl halides, and thiocarbonyl compounds. Such polymerization controlling agents may be used singly and two or more species thereof may be used in combination.

The amount (% by weight) of the polymerization controlling agent used is preferably 0.0005 to 5, and more preferably 0.001 to 2, based on the total weight of the water-soluble vinyl monomer (a1) and the hydrolyzable vinyl monomer (a2).

When applying a suspension polymerization method or a reverse phase suspension polymerization method as a polymerization method, the polymerization may be carried out in the presence of a conventional dispersing agent or a conventional surfactant, if necessary. In the case of a reverse phase suspension polymerization method, the polymerization can be carried out using a conventional hydrocarbon solvent such as xylene, n-hexane, and n-heptane.

The polymerization onset temperature can appropriately be adjusted depending on the type of the catalyst to be used, and it is preferably 0 to 100° C., and more preferably 2 to 80° C.

When a solvent (organic solvents, water, etc.) is used for polymerization, it is preferred to distill off the solvent after the polymerization. When an organic solvent is contained in the solvent, the content (% by weight) of the organic solvent after distillation, based on the weight of the crosslinked polymer (A), is preferably 0 to 10, more preferably 0 to 5, particularly preferably 0 to 3, and most preferably 0 to 1. When the content is within this range, the absorption performance of the water-absorbent resin composition is further improved.

When water is contained in the solvent, the content (% by weight) of water after distillation, based on the weight of the crosslinked polymer (A), is preferably 0 to 20, more preferably 1 to 10, particularly preferably 2 to 9, and most preferably 3 to 8. Within such ranges, the absorption performance is further improved.

It is possible to obtain a hydrous gel-like material (hereinafter briefly referred to as hydrous gel) in which the crosslinked polymer (A) contains water by the above-described polymerization method, and the crosslinked polymer (A) can be obtained by further drying the hydrous gel.

When using an acid group-containing monomer, such as acrylic acid and methacrylic acid, as the water-soluble vinyl monomer (a1), the hydrous gel may be neutralized with a base. The degree of neutralization of acid groups is preferably 50 to 80 mol %. When the degree of neutralization is less than 50 mol %, a hydrous gel polymer with high tackiness is to be obtained, so that the workability in production and use may be deteriorated. Moreover, a water-absorbent resin composition with a smaller water retention capacity may be obtained. On the other hand, when the degree of neutralization exceeds 80%, a resin with a high pH is to be obtained and the safety to the skin of a human body may be concerned.

In the production of a water-absorbent resin composition, the neutralization may be performed at any stage in or after the polymerization of the crosslinked polymer (A); preferred examples include to neutralize in the state of a hydrous gel.

As a base for neutralization, alkali metal hydroxides, such as sodium hydroxide and potassium hydroxide, and alkali metal carbonates, such as sodium carbonate, sodium bicarbonate, and potassium carbonate, can usually be used.

The hydrous gel produced by polymerization may be chopped before drying according to need. The size (longest diameter) of the chopped gel is preferably 50 μm to 10 cm, more preferably 100 μm to 2 cm, and particularly preferably 1 mm to 1 cm. When the size is within such ranges, dryability during a drying step is further improved.

Chopping can be carried out by a conventional method and chopping can be done by using a normal chopping machine (e.g., Bex Mill, rubber chopper, Pharma Mill, mincing machine, impact type pulverizer, roll type pulverizer), etc.

The contents of an organic solvent and water can be determined from the weight loss of a sample when heating it with an infrared moisture content analyzer (JE400 manufactured by KETT, or the like; 120±5° C., 30 minutes, atmosphere humidity before heating: 50±10% RH, lamp specification: 100 V, 40 W).

As a method for distilling off and drying the solvent (including the water) contained in the hydrous gel, a method of distilling (drying) it with hot blast having a temperature of 80 to 230° C., a thin film drying method using, e.g., a drum dryer heated at 100 to 230° C., a (heating) reduced pressure drying method, a freeze-drying method, a drying method using infrared radiation, decantation, filtration, etc. can be applied.

After obtaining the crosslinked polymer (A) by drying the hydrous gel, pulverization may be performed as well. The method of pulverization is not particularly limited and ordinary pulverizing apparatuses (e.g., hammer type pulverizer, impact type pulverizer, roll type pulverizer, and jet stream type pulverizer) can be used. The pulverized crosslinked polymer can be adjusted in its particle size by sieving, etc. according to need.

The weight average particle diameter (μm) of the crosslinked polymer (A) when having been sieved according to need is preferably 100 to 800, more preferably 200 to 700, even more preferably 250 to 600, particularly preferably 300 to 500, and most preferably 350 to 450. Within such ranges, the absorption performance is further improved.

The weight average particle diameter is measured by the method disclosed in Perry's Chemical Engineers' Handbook, Sixth Edition (McGraw-Hill Book Company, 1984, page 21) by using a RO-TAP sieve shaker and standard sieves (JIS Z8801-1:2006). Specifically, JIS standard sieves are combined, for example, in the order of 1000 μm, 850 μm, 710 μm, 500 μm, 425 μm, 355 μm, 250 μm, 150 μm, 125 μm, 75 μm, 45 μm, and a bottom tray when viewed from the top. About 50 g of particles to be measured are put on the top sieve and then shaken for five minutes by a RO-TAP sieve shaker. Then, the particles received on the respective sieves and the bottom tray are weighed and the weight fractions of the particles on the respective sieves are calculated with the total weight of the particles considered to be 100% by weight. The calculated values are plotted on a logarithmic probability sheet {taking the size of openings of a sieve (particle diameter) as abscissa and the weight fraction as ordinate} and then a line connecting the respective points is drawn. Subsequently, a particle diameter that corresponds to a weight fraction of 50% by weight is determined and this is defined as a weight average particle diameter.

In the case of pulverization has been performed, since a smaller content of particulates contained in the crosslinked polymer (A) after the pulverization results in better absorption performance, the content (% by weight) of the particulates being 106 μm or less in size (preferably being 150 μm or less in size) that accounts for in the total weight of the crosslinked polymer (A) is preferably 3 or less, and more preferably 1 or less. The content of the particulates can be determined using a graph produced when determining the aforementioned weight average particle diameter.

In the case of pulverization has been performed, there is no particular limitation with respect to the shape of the crosslinked polymer (A) after the pulverization, and an irregularly pulverized form, a scaly form, a pearl-like form, a rice grain form, etc. can be applied. Among these, an irregularly pulverized form is preferred because good entangling with a fibrous material in an application such as disposable diaper is ensured and the fear of falling off from the fibrous material is eliminated.

The crosslinked polymer (A) may contain some other components such as a residual solvent and a residual crosslinking component as long as the performance of the polymer is not impaired.

The water-absorbent resin composition of the present invention preferably has a structure in which the surface of the crosslinked polymer (A) is crosslinked with a surface-crosslinking agent (d). By crosslinking the surface of the crosslinked polymer (A), it is possible to enhance the gel strength of a water-absorbent resin composition and it is possible to satisfy a desirable water retention capacity and a desirable amount of absorption under load of a water-absorbent resin composition. As the surface crosslinking agent (d), there can be used conventional surface crosslinking agents (e.g., polyglycidyl compounds, polyamines, polyaziridine compounds, polyisocyanate compounds, etc. disclosed in JP-A-59-189103; polyhydric alcohols disclosed in JP-A-58-180233 and JP-A-61-16903; silane coupling agents disclosed in JP-A-61-211305 and JP-A-61-252212; alkylene carbonates disclosed in JP-A-5-508425; polyoxazoline compounds disclosed in JP-A-11-240959; and multivalent metal salts disclosed in JP-A-51-136588 and JP-A-61-257235). Among these surface-crosslinking agents, polyglycidyl compounds, polyhydric alcohols and polyamines are preferred, polyglycidyl compounds and polyhydric alcohols are more preferred, polyglycidyl compounds are particularly preferred, and ethylene glycol diglycidyl ether is most preferred from the viewpoint of economic efficiency and absorption characteristics. The surface-crosslinking agent may be used singly or two or more species thereof may be used in combination.

When surface-crosslinking is performed, the amount (% by weight) of the surface-crosslinking agent (d) used is not particularly limited because it can be varied depending upon the type of the surface-crosslinking agent, the conditions for crosslinking, target performance, etc.; from the viewpoint of absorption characteristics and the like, it is preferably 0.001 to 3, more preferably 0.005 to 2, and particularly preferably 0.01 to 1.5, relative to 100 parts by weight of the water-absorbent resin.

The surface-crosslinking of the crosslinked polymer (A) can be performed by mixing the crosslinked polymer (A) with the surface-crosslinking agent (d) and, according to need, heating as well. Examples of the method for the mixing of the crosslinked polymer (A) with the surface-crosslinking agent (d) include a method of uniformly mixing the crosslinked polymer (A) with the surface-crosslinking agent (d) by use of a mixing apparatus, such as a cylindrical mixer, a screw type mixer, a screw type extruder, a Turbulizer, a Nauter mixer, a double-arm kneader, a fluidization mixer, a V-type mixer, a mincing mixer, a ribbon mixer, a fluidization mixer, an air mixer, a rotating disc mixer, a conical blender, and a roll mixer. Under the present circumstances, the surface-crosslinking agent (d) may be used with dilution with water and/or an arbitrary solvent.

The temperature at the time of mixing the crosslinked polymer (A) with the surface-crosslinking agent (d) is not particularly limited and is preferably 10 to 150° C., more preferably 20 to 100° C., and particularly preferably 25 to 80° C.

After mixing the crosslinked polymer (A) with the surface-crosslinking agent (d), it is usual to perform heating treatment. From the viewpoint of the break resistance of resin particles, the heating temperature is preferably 100 to 180° C., more preferably 110 to 175° C., and particularly preferably 120 to 170° C. Heating at 180° C. or lower is advantageous in facility aspect because indirect heating using steam can be employed therefor, whereas at a heating temperature of lower than 100° C., absorption performance may be deteriorated. The heating time can appropriately be set depending on the heating temperature, and from the viewpoint of absorption performance, it is preferably 5 to 60 minutes, and more preferably 10 to 40 minutes. The water-absorbent resin obtained by surface-crosslinking may be further surface-crosslinked using a surface-crosslinking agent of the same type as or a different type from the surface-crosslinking agent used first.

After crosslinking the surface of the crosslinked polymer (A) with the surface-crosslinking agent (d), the particle size is adjusted by sieving, if necessary. The average particle diameter of the particles obtained is preferably 100 to 600 µm, and more preferably 200 to 500 µm. The content of particulates is preferred to be as small as possible; the content of particle being equal to or smaller than 100 µm is preferably 3% by weight or less, and it is more preferred that the content of particles being equal to or smaller than 150 µm be 3% by weight or less.

In the first present invention, when surface-crosslinking the crosslinked polymer (A) with the surface-crosslinking agent (d), it is permitted to perform the surface-crosslinking before the mixing of the crosslinked polymer (A) and the cationic organic polymer (c) described below, or perform the surface-crosslinking simultaneously with the mixing of the crosslinked polymer (A) and the cationic organic polymer (c) described below, or perform the surface-crosslinking after the mixing of the crosslinked polymer (A) and the cationic organic polymer (c) described below; from the viewpoint of absorption performance of a water-absorbent resin composition under load, it is preferred to perform the surface-crosslinking of the crosslinked polymer (A) with the surface-crosslinking agent (d) before mixing the crosslinked polymer (A) with the cationic organic polymer (c).

In the second present invention, when surface-crosslinking the crosslinked polymer (A) with the surface-crosslinking agent (d), it is permitted to perform the surface-crosslinking before the mixing of the crosslinked polymer (A) and the cationic organic polymer (B) described below, or perform the surface-crosslinking simultaneously with the mixing of the crosslinked polymer (A) and the cationic organic polymer (B) described below, or perform the surface-crosslinking after the mixing of the crosslinked polymer (A) and the cationic organic polymer (B) described below; from the viewpoint of absorption performance of a water-absorbent resin composition under load, it is preferred to perform the surface-crosslinking of the crosslinked polymer (A) with the surface-crosslinking agent (d) before mixing the crosslinked polymer (A) with the cationic organic polymer (B).

In the water-absorbent resin composition of the present invention, the crosslinked polymer (A) may be further treated with a hydrophobic substance, and as the method for the treating with the hydrophobic substance, the method disclosed in JP-A-2013-231199, etc. can be used.

The water-absorbent resin composition of the first present invention comprises a cationic organic polymer (c) having a number average molecular weight of 1,000,000 or more. As the cationic organic polymer (c), there can be used an organic polymer having a cationic group (an amino group, an ammonio group, an imino group, an iminium group, a phosphino group, a phosphonium group, a sulfonium group, etc.); from the viewpoint of ease of synthesis, etc., a polymer having an amino group and/or an ammonio group as a cationic group is preferred.

In the polymer having an amino group and/or an ammonio group, the cationic organic polymer having an amino group can be obtained by polymerizing a monomer having an amino group, and the cationic organic polymer (c) having an ammonio group can be obtained a method of polymerizing a monomer having an ammonio group, a method of reacting a cationic organic polymer having an amino group with an electrophilic reagent, or a method of performing polymerization after reacting a monomer having an amino group with an electrophilic reagent. A polymer having an amino group and an ammonio group can be obtained by combining these methods.

As the electrophilic reagent, there can be used compounds described below. Such electrophilic reagents may be used singly, or alternatively, two or more species thereof may be used in combination.

Examples of the cationic organic polymer (c) include polyallylamine, polydiallylamine, poly(N-alkylallylamine), poly(alkyldiallylamine), monoallylamine-diallylamine copolymers, N-alkylallylamine-monoallylamine copolymers, monoallylamine-dialkyldiallylammonium salt copolymers, diallylamine-dialkyldiallylammonium salt copolymers, polyaminoethyl (meth)acrylate, polydimethylaminoethyl (meth)acrylate, polydiethylaminoethyl (meth)acrylate, polydimethylaminoethyl (meth)acrylamide, homopolymers of a quaternary alkylaminoethyl (meth)acrylate salt, quaternary alkylaminoethyl (meth)acrylate salt-acrylamide copolymers, linear polyethyleneimine, branched polyethyleneimine, polyethylene polyamine, polypropylene polyamine, polyamide polyamine, polyether polyamine, polyvinylamine, polyamidepolyamine-epichlorohydrin resin, and polyamidine. Additional examples include amino-modified products prepared by reacting formaldehyde and diethylamine to polyacrylamide or polymethacrylamide.

The cationic organic polymer (c) having an amino group and/or an ammonio group can be obtained by polymerizing a monomer having an amino group and/or a monomer having an ammonio group by a conventional polymerization method (e.g., methods disclosed in, etc.), and it can be obtained as a polymer flocculant and a dye fixing agent from the market.

The cationic organic polymer (c) may be in the form of a salt with an anion that is a conjugate base of a strong acid. Examples of the strong acid include inorganic acids and organic acids. Of the inorganic acids and the organic acids, strong acids having a molecular weight of 30 to 300 are preferred, and example of such preferred strong acids include hydrochloric acid (molecular weight: 36, pKa: −7), hydrobromic acid (molecular weight: 81, pKa: −9), hydroiodic acid (molecular weight: 128, pKa: −10), sulfuric acid (molecular weight: 98, pKa: −10), nitric acid (molecular weight: 63, pKa: −1.5), perchloric acid (molecular weight: 100, pKa: −10), tetrafluoroboric acid (molecular weight: 88, pKa: −4.9), hexafluorophosphoric acid (molecular weight: 146, pKa: −20), trifluoroacetic acid (molecular weight: 114, pKa: 0.2), methanesulfonic acid (molecular weight: 96, pKa: −1.9), paratoluenesulfonic acid (molecular weight: 172, pKa: −2.8), trifluoromethanesulfonic acid (molecular weight: 150, pKa: −13), and camphorsulfonic acid (molecular weight: 232, pKa: −1.2).

When the cationic group which the cationic organic polymer (c) has formed a salt, the method for forming a salt with an acidic compound may be, for example, to react the amino group contained in the cationic organic polymer (c) with an electrophilic reagent {e.g., organic halides (methyl chloride, ethyl chloride, methyl bromide, ethyl bromide, etc.), dialkyl carbonates (dimethyl carbonate, diethyl carbonate, etc.), and sulfates (dimethyl sulfate, diethyl sulfate, etc.)}, or to neutralize an amino group or an ammonio group with an acidic compound. The formation of a salt can also be performed by polymerizing a monomer having an amino group or an ammonio group after converting it into a salt.

The reaction of an amino group with an electrophilic reagent can be performed by mixing an amino group-containing monomer or polymer with the electrophilic reagent in the presence of water or an arbitrary solvent, followed by heating, if necessary, and the neutralization of an amino group or an ammonio group with the acidic compound can be performed by mixing an amino or ammonio group-containing monomer or polymer with the acidic compound in the presence of water or an arbitrary solvent.

The number average molecular weight of the cationic organic polymer (c) is 1,000,000 or more, preferably 1,000,000 to 20,000,000, and more preferably 1,100,000 to 10,000,000. It is undesirable that the number average molecular weight is smaller than 1,000,000 because, if so, the liquid permeability of a water-absorbent resin composition and the blocking property of gel will be deteriorated.

The number average molecular weight of a cationic organic polymer (c) is measured, for example, by using a gel permeation chromatography (1200 Series, manufactured by Agilent Technologies, Ltd.) equipped with a multi angle light scattering detector (DAWN HELEOS II, manufactured by Shoko Scientific Co., Ltd.) (hereinafter abbreviated as GPC-MALS), using an aqueous solution containing 0.5 M acetic acid and 0.2 M sodium nitrate as a solvent, adjusting the sample concentration to 0.2% by weight, using a polymer-based filler (OHpak SB-806M HQ produced by Shoko Scientific Co., Ltd.) as a column stationary phase, and adjusting the column temperature to 40° C.

As the cationic organic polymer (c), a polymer having an ammonio group is preferred in that the liquid permeability of a resulting water-absorbent resin composition is enhanced thereby, the ammonio group is more preferably a salt with a conjugate base of a strong acid, and particularly preferably a salt with a conjugate base of a strong acid having a molecular weight of 30 to 300.

The water-absorbent resin of the first present invention can be obtained by mixing a crosslinked polymer (A) with a cationic organic polymer (c). Examples of the method for the mixing include a method of uniformly mixing by use of a conventional mixing apparatus, such as a cylindrical mixer, a screw type mixer, a screw type extruder, a Turbulizer, a Nauter mixer, a double-arm kneader, a fluidization mixer, a V-type mixer, a mincing mixer, a ribbon mixer, a fluidization mixer, an air mixer, a rotating disc mixer, a conical blender, and a roll mixer.

In mixing the crosslinked polymer (A) with the cationic organic polymer (c), it is preferred to add the cationic organic polymer (c) to the crosslinked polymer (A) under stirring. The cationic organic polymer (c) to be added may be added simultaneously with water and/or a solvent.

When adding the cationic organic polymer (c) simultaneously with water and/or a solvent, it is preferred to add a solution in which the cationic organic polymer (c) is dissolved in water and/or a solvent or a dispersion in which the cationic organic polymer (c) is dispersed in water and/or a solvent, and it is more preferred, from the viewpoint of workability, etc., to add a dispersion. When adding a solution or a dispersion, it is preferred to add it by spraying or dropping.

When adding the cationic organic polymer (c) as a dispersion, the dispersion is preferred to be an in-oil dispersion in which the cationic organic polymer (c) is dispersed in a hydrophobic solvent because the blocking of a water-absorbent resin composition can be suppressed.

In the case of the in-oil dispersion in which the cationic organic polymer (c) is dispersed in the hydrophobic solvent, the content of the cationic organic polymer (c) contained in the dispersion is preferably 5 to 70% by weight based on the total weight of the dispersion comprising the hydrophobic solvent and the cationic organic polymer (c), and more preferably 10 to 60% by weight.

Regarding the dispersed particle diameter of the cationic organic polymer (c) dispersed in the hydrophobic solvent, the volume-average particle diameter is preferably 0.1 nm to 1 mm, and more preferably is 1 nm to 100 μm. The volume-average particle diameter of the cationic organic polymer (c) is measured, for example, by a dynamic light scattering method using a laser diffraction/scattering particle size distribution analyzer (e.g., LA-950 and SZ-100, both manufactured by HORIBA, Ltd.).

The preparation of the in-oil dispersion of the cationic organic polymer (c) using a hydrophobic solvent can be performed by a conventional method, such as a method of mechanically mixing the cationic organic polymer (c) in a dispersion medium using a conventional dispersing device such as a homogenizer and a dissolver, and a method of emulsion-polymerizing or suspension-polymerizing, in a dispersion medium, a monomer that is to be a constituent of the cationic organic polymer (c).

The dispersion medium may, according to need, contain an arbitrary additive such as a dispersing agent and a stabilizer.

In the case of mechanically mixing the cationic organic polymer (c) in a dispersion medium, this can be performed by, for example, a method in which a cationic organic polymer (c) melted by heating to its glass transition temperature or more is added into a dispersion medium under stirring and then is mechanically mixed, a method in which a cationic organic polymer (c) is mixed with a dispersion medium heated to the glass transition temperature of the cationic organic polymer (c) or more, thereby melting the cationic organic polymer (c), which is then cooled slowly to the glass transition temperature or less under stirring and mixing, or a method in which a solution of a cationic organic polymer (c) is mixed under stirring a dispersion medium that is a poor solvent.

In the case of emulsion-polymerizing or suspension-polymerizing a monomer that is to be a constituent of the cationic organic polymer (c) in a dispersion medium, the emulsion-polymerization or the suspension-polymerization can be performed by a method disclosed in JP-B-54-37986, JP-B-52-39417, etc.

The temperature at the time of mixing the crosslinked polymer (A) with the cationic organic polymer (c) is not particularly limited and is preferably 10 to 150° C., more preferably 20 to 100° C., and particularly preferably 25 to 80° C.

After mixing the crosslinked polymer (A) with the cationic organic polymer (c), heat treatment may be performed as well. From the viewpoint of the break resistance of resin particles, the heating temperature is preferably 25 to 180° C., more preferably 30 to 175° C., and particularly preferably 35 to 170° C. Heating at 180° C. or lower is advantageous in facility aspect because indirect heating using steam can be employed therefor. Failing to perform heating allows water and a solvent used together to remain superfluously in a water-absorbent resin and may result in deteriorated absorption performance.

In the case of heating after mixing of the crosslinked polymer (A) with the cationic organic polymer (c), the heating time can appropriately be set depending on the heating temperature, and from the viewpoint of absorption performance, it is preferably 5 to 60 minutes, and more preferably 10 to 40 minutes. The water-absorbent resin obtained by mixing the crosslinked polymer (A) with the cationic organic polymer (c) can be surface-treated as well using a cationic organic polymer of the same type as or a different type from the type of the cationic organic polymer used first.

The water-absorbent resin composition of the first present invention may be used after adjusting the particle size by sieving after mixing the crosslinked polymer (A) with the cationic organic polymer (c). The average particle diameter of the particles obtained through particle size adjustment is preferably 100 to 600 μm, and more preferably 200 to 500 μm. The content of particulates is preferred to be as small as possible; the content of particulates being equal to or smaller than 100 μm is preferably 3% by weight or less, and it is more preferred that the content of particulates being equal to or smaller than 150 μm be 3% by weight or less.

In the water-absorbent resin composition of the first present invention, the content of the cationic organic polymer (c) can be adjusted according to the application of the water-absorbent resin composition, and the content is preferably 0.01 to 5% by weight based on the total weight of the crosslinked polymer (A) and the cationic organic polymer (c), and more preferably 0.1 to 3% by weight. It is more preferred that the content be within this range because, if so, the liquid permeability of a water-absorbent resin composition and the anti-blocking property of gel become good.

The water-absorbent resin composition of the first present invention comprises the crosslinked polymer (A) and the cationic organic polymer (c) and may further comprise a multivalent metal salt (e). Inclusion of the multivalent metal salt (e) improves the anti-blocking property and the liquid permeability of a water-absorbent resin composition. Examples of the multivalent metal salt (e) include salts of at least one metal selected from the group consisting of magnesium, calcium, zirconium, aluminum, and titanium with the above-mentioned inorganic acids or organic acids.

Among these, inorganic salts of aluminum and inorganic salts of titanium are preferred from the viewpoint of easy availability and solubility, aluminum sulfate, aluminum chloride, aluminum potassium sulfate, and aluminum sodium sulfate are more preferred, aluminum sulfate and aluminum sodium sulfate are particularly preferred, and aluminum sodium sulfate is most preferred. These may be used singly or two or more species thereof may be used in combination.

From the viewpoint of absorption performance and anti-blocking property, the amount (% by weight) of the multivalent metal salt (e) used, based on 100 parts by weight of the water-absorbent resin, is preferably 0.05 to 5, more preferably 0.1 to 3, and particularly preferably 0.2 to 2.

In the case that the water-absorbent resin composition further contains the multivalent metal salt (e), while the water-absorbent resin composition of the first present invention can be obtained by mixing the crosslinked polymer (A), the cationic organic polymer (c) and the multivalent metal salt (e), it is permitted to mix the multivalent metal salt (e) before mixing the cationic organic polymer (c) with the crosslinked polymer (A), or it is permitted to mix the salt with a water-absorbent resin composition, or it is permitted to mix the salt after mixing the cationic organic polymer (c) with the crosslinked polymer (A). Moreover, it is also permitted to mix the crosslinked polymer (A) with the multivalent metal salt (e) and then mix the cationic organic polymer (c) and further mix the multivalent metal salt (e). Especially, from the viewpoint of the absorption performance of a water-absorbent resin composition under pressure, the multivalent metal salt (e) is preferably mixed with the crosslinked polymer (A) before being mixed with the cationic organic polymer (c).

When the multivalent metal salt (e) is mixed with the crosslinked polymer (A) before being mixed with the cationic organic polymer (c), the multivalent metal salt (e) may be mixed at any stage of before, simultaneously with, and after the surface-crosslinking with the surface-crosslinking agent (d), but, from the viewpoint of the absorption performance of a water-absorbent resin composition under pressure, it is preferred to mix the salt at the same time as the surface-crosslinking with the surface-crosslinking agent (d).

The method of mixing the multivalent metal salt (e) can be performed in the same manner as the above-described cationic organic polymer (c), and the mixing temperature is also the same. After mixing the multivalent metal salt (e), heating treatment may be performed, and the condition thereof is the same as the heating condition after mixing the cationic organic polymer (c), and a preferred condition is also the same. The water-absorbent resin composition containing the multivalent metal salt (e) may be used after adjusting the particle size thereof, and the method of the adjustment is the same as that of the particle size adjustment after adding the cationic organic polymer (c), and the particle diameter after the adjustment is also the same.

The water-absorbent resin composition of the first present invention may further comprise water-insoluble inorganic particles (f). By comprising the water-insoluble inorganic particles (f), the surface of the particles contained in the water-absorbent resin composition being surface-treated with the water-insoluble inorganic particles (f), and, as a result, the anti-blocking property and the liquid permeability of the water-absorbent resin composition are improved.

Examples of the water-insoluble inorganic particles (f) include colloidal silica, fumed silica, clay, and talc; from the viewpoint of easy availability, handleability, and absorption performance, colloidal silica and silica are preferred, and colloidal silica is more preferred. The water-insoluble inorganic particles (f) may be used singly or two or more species thereof may be used in combination.

From the viewpoint of absorption performance, the amount (parts by weight) of the water-insoluble inorganic particles (f) used is preferably 0.01 to 5, more preferably 0.05 to 1, and particularly preferably 0.1 to 0.5, based on the 100 parts by weight of the water-absorbent resin.

When further comprising the water-insoluble inorganic particles (f), it is preferred to mix the water-absorbent resin composition with the water-insoluble inorganic particles (f), and the mixing can be performed by the same method as the mixing of the above-described cationic organic polymer (c), and the condition thereof is also the same.

The water-absorbent resin composition after mixing the water-insoluble inorganic particles (f) may be used after adjusting the particle size thereof, and the particle size adjustment can be performed in the same manner as the particle size adjustment performed after mixing the cationic organic polymer (c), and the particle diameter after the particle size adjustment is also the same.

The water-absorbent resin composition of the first present invention may, according to need, contain an additive (e.g., conventional (disclosed in JP-A-2003-225565 and JP-A-2006-131767) antiseptics, antifungal agents, antibacterial agents, antioxidants, UV absorbers, coloring agents, aromatics, deodorants, liquid permeation improvers, organic fibrous materials, etc.). When such an additive is contained, the content (% by weight) of the additive is preferably 0.001 to 10, more preferably 0.01 to 5, particularly preferably 0.05 to 1, and most preferably 0.1 to 0.5, based on the weight of the crosslinked polymer (A).

The production method of the first present invention comprises a step of mixing a crosslinked polymer (A) comprising, as essential constitutional units, a water-soluble vinyl monomer (a1) and/or a vinyl monomer (a2) that turns into a water-soluble vinyl monomer (a1) through hydrolysis, and a crosslinking agent (b); with an in-oil dispersion of a cationic organic polymer (c) having a number average molecular weight of 1,000,000 or more.

As the water-soluble vinyl monomer (a1), the vinyl monomer (a2) that turns into a water-soluble vinyl monomer (a1) through hydrolysis, the crosslinking agent (b), the crosslinked polymer (A), the cationic organic polymer (c), and the in-oil dispersion thereof, substances the same as those previously described can be used, and preferred examples are also the same.

The step of mixing the crosslinked polymer (A) with the in-oil dispersion of the cationic organic polymer (c) can be performed by mixing the crosslinked polymer (A) with the in-oil dispersion of the cationic organic polymer (c) by using the above-mentioned conventional mixing apparatus. The temperature at the time of the mixing is preferably 10 to 150° C., more preferably 20 to 100° C., and particularly preferably 25 to 80° C.

The apparent density (g/ml) of the water-absorbent resin composition obtained by the production method of the first present invention is preferably 0.50 to 0.80, more preferably 0.52 to 0.75, and particularly preferably 0.54 to 0.70. Within such ranges, the skin irritation resistance of an absorbent article is further improved. The apparent density of the water-absorbent resin composition is measured at 25° C. in accordance with JIS K7365:1999.

The water-absorbent resin composition of the second present invention comprises a cationic organic polymer (B). The cationic organic polymer (B) has a cationic group that is a salt of at least one amino group (am) selected from the group consisting of a —$NH_2$ group, a mono-alkyl(having 1 to 4 carbon atoms)-substituted —$NH_2$ group (namely, a group formed by substituting one hydrogen atom of a —$NH_2$ group by an alkyl group), and a di-alkyl(having 1 to 4 carbon atoms)-substituted —$NH_2$ group (namely, a group formed by substituting two hydrogen atoms of a —$NH_2$ group by alkyl groups) (in the present invention, a substituted or unsubstituted —$NH_2$ group is also merely referred to as an amino group (am)). Specific examples of the amino group (am) include a —$NH_2$ group, a methylamino group, an ethylamino group, a propylamino group, a n-butylamino group, a 1-methylpropylamino group, a 2-methylpropylamino group, a tert-butylamino group, a dimethylamino group, a diethylamino group, and a dibutylamino group.

Examples of the salt having an amino group (am) include a group formed by neutralizing the amino group (am) with an acid (preferably, a Lewis acid or a Brønsted acid).

Of the acids for neutralizing the amino group (am), examples of the Lewis acid include halogenated main group element compounds such as boron trifluoride and aluminum chloride, and main group element-containing triflates such as scandium triflate, and examples of the Brønsted acid include inorganic acids and organic acids.

Examples of the inorganic acids include oxo acids (perchloric acid, nitric acid, sulfuric acid, phosphoric acid, tetrafluoroboric acid, hexafluorophosphoric acid, boric acid, etc.) and hydrogen halides (hydrogen fluoride, hydrochloric acid, hydrobromic acid, cyanhydric acid, etc.), and examples of the organic acids include organic carboxylic acids (acetic acid, trifluoroacetic acid, etc.), organic sulfonic acids {aliphatic sulfonic acids (methanesulfonic acid, trifluoromethanesulfonic acid, etc.), alicyclic sulfonic acids (camphorsulfonic acid, etc.), and aromatic sulfonic acids (paratoluenesulfonic acid, etc.)}.

In particular, a Brønsted acid is preferred.

As the acid for neutralizing the amino group (am), a strong acid having a molecular weight of 30 to 300 is preferred, and a strong acid having a molecular weight of 35 to 200 is more preferred. In the present invention, a strong acid means any acid having a pKa of 1 or less (preferably 0 or less) (aqueous solution, at 25° C.)

As the strong acid, hydrochloric acid (molecular weight: 36, pKa: −7), hydrobromic acid (molecular weight: 81, pKa: −9), hydriodic acid (molecular weight: 128, pKa: −10), sulfuric acid (molecular weight: 98, pKa: −10), nitric acid (molecular weight: 63, pKa: −1.5), perchloric acid (molecular weight: 100, pKa: −10), tetrafluoroboric acid (molecular weight: 88, pKa: −4.9), hexafluorophosphoric acid (molecular weight: 146, pKa: −20), trifluoroacetic acid (molecular weight: 114, pKa: 0.2), methanesulfonic acid (molecular weight: 96, pKa: −1.9), paratoluenesulfonic acid (molecular weight: 172, pKa: −2.8), trifluoromethanesulfonic acid (molecular weight: 150, pKa: −13), and camphorsulfonic acid (molecular weight: 232, pKa: −1.2) are preferred, and hydrochloric acid (molecular weight: 36, pKa: −7), sulfuric acid (molecular weight: 98, pKa: −10), and methanesulfonic acid (molecular weight: 96, pKa: −1.9) are more preferred.

The cationic organic polymer (B) to be used for the water-absorbent resin composition of the second present invention is a polymer of a monomer composition comprising, as an essential component, a cationic monomer having the above-described amino group (am) and/or a cationic monomer having a salt of the amino group (am), or a salt of the polymer. The cationic organic polymer (B) may be a polymer of a monomer composition or may be a salt of a polymer of a monomer composition as long as it has a cationic group that is a salt of the amino group (am). For example, when the monomer composition is a monomer composition comprising a cationic monomer having a salt of the amino group (am) as an essential component, the polymer (B) may be a polymer of the monomer composition, and on the other hand, when the monomer composition is a monomer composition comprising a cationic monomer having the amino group (am) as an essential component, the polymer (B) may be a salt of a polymer of the monomer composition. Moreover, for example, when the monomer composition is a monomer composition comprising a cationic monomer having the amino group (am) and a cationic monomer having a salt of the amino group (am), the polymer (B) may be a polymer of this monomer composition or a salt of the polymer. When the cationic monomer has the amino group (am), the cationic group of the polymer (B) is a salt of the amino group, and/or when the cationic monomer has a salt of the amino group (am), the cationic group the polymer (B) is the salt thereof.

Examples of the cationic monomer include a cationic monomer having at least one amino group (am) selected from the group consisting of —$NH_2$ group-containing groups (e.g., aminoalkyl(having 1 to 4 carbon atoms) groups), mono-alkyl(having 1 to 4 carbon atoms)-substituted —$NH_2$ groups (e.g., alkyl(having 1 to 4 carbon atoms) aminoalkyl(having 1 to 4 carbon atoms) groups), and di-alkyl(having 1 to 4 carbon atoms)-substituted —$NH_2$ groups (e.g., dialkyl(having 1 to 4 carbon atoms)aminoalkyl(having 1 to 4 carbon atoms) groups); and more specifically include amino group (am)-containing (meth)acrylates, amino group (am)-containing (meth)acrylic amides, and amino group (am)-containing vinyl compounds.

Examples of the amino group (am)-containing (meth) acrylates include aminoalkyl(having 1 to 4 carbon atoms) (meth)acrylate (aminoethyl (meth)acrylate, aminopropyl (meth)acrylate, etc.), alkyl(having 1 to 4 carbon atoms) aminoalkyl(having 1 to 4 carbon atoms) (meth)acrylates (e.g., methylaminoethyl (meth)acrylate, ethylaminoethyl (meth)acrylate, tert-butylaminoethyl (meth)acrylate, methylaminopropyl (meth)acrylate, ethylaminopropyl (meth) acrylate, and tert-butylaminoethyl (meth)acrylate), and di-alkyl(having 1 to 4 carbon atoms)aminoalkyl(having 1 to 4 carbon atoms) (meth)acrylates (e.g., dimethylaminoethyl (meth)acrylate and diethylaminoethyl (meth)acrylate, dibutylaminoethyl (meth)acrylate, dimethylaminopropyl (meth) acrylate, diethylaminopropyl (meth)acrylate, and dibutylaminopropyl (meth)acrylate); examples of the amino group (am)-containing (meth)acrylamides include aminoalkyl (having 1 to 4 carbon atoms) (meth)acrylamides (e.g., aminoethyl (meth)acrylamide and aminopropyl (meth)acrylamide), alkyl (having 1 to 4 carbon atoms) aminoalkyl (having 1 to 4 carbon atoms) (meth)acrylamides (e.g., methylaminoethyl (meth)acrylamide, ethylaminoethyl (meth) acrylamide, tert-butylaminoethyl (meth)acrylamide, methylaminopropyl (meth)acrylamide, ethylaminopropyl (meth) acrylamide, and tert-butylaminoethyl (meth)acrylamide), and di-alkyl(having 1 to 4 carbon atoms)aminoalkyl(having 1 to 4 carbon atoms) (meth)acrylamides (e.g., dimethylaminoethyl (meth)acrylamide, diethylaminoethyl (meth)acrylamide, dibutylaminoethyl (meth)acrylamide, dimethylaminopropyl (meth)acrylamide, diethylaminopropyl (meth) acrylamide, and dibutylaminopropyl (meth)acrylamide); and examples of the amino group (am)-containing vinyl compounds include p-aminostyrene, 2-vinylpyridine, vinylaniline, and (meth)allylamine.

Such cationic monomers may be singly or two or more species thereof may be used in combination.

As the cationic monomer, particularly preferred among the amino group (am)-containing (meth)acrylates and the amino group (am)-containing (meth)acrylamides are aminoalkyl(having 1 to 4 carbon atoms) (meth)acrylates, alkyl (having 1 to 4 carbon atoms)aminoalkyl(having 1 to 4 carbon atoms) (meth)acrylates, di-alkyl(having 1 to 4 carbon atoms)aminoalkyl(having 1 to 4 carbon atoms) (meth)acrylates, aminoalkyl(having 1 to 4 carbon atoms) (meth)acrylamides, alkyl(having 1 to 4 carbon atoms) aminoalkyl (having 1 to 4 carbon atoms) (meth)acrylamides, and di-alkyl(having 1 to 4 carbon atoms)aminoalkyl(having 1 to 4 carbon atoms) (meth)acrylamides; and aminoethyl (meth) acrylate and N,N-dimethylaminoethyl (meth)acrylate are more preferred.

When the cationic organic polymer (B) is one produced by polymerizing a monomer composition comprising, as an essential constituent, a cationic monomer having a salt of at least one amino group (am) selected from the group consisting of a —$NH_2$ group, a mono-alkyl (having 1 to 4 carbon atoms)-substituted —$NH_2$ group, and a di-alkyl(having 1 to 4 carbon atoms)-substituted —$NH_2$ group, examples of the cationic monomer include salt of monomers having the above-mentioned amino group (am), and particularly include salts formed by neutralizing cationic monomers having the above-mentioned amino group (am) with the above-mentioned Lewis acid or the above-mentioned Brønsted acid.

Examples of the monomer that constitutes the above-described monomer composition together with the above-described cationic monomer include the same monomers as the above-described water-soluble vinyl monomer (a1), the above-described additional copolymerizable vinyl monomer (a3), and the above-described hydrolyzable vinyl monomer (a2), and especially, (meth)acrylic acid (salts) and (meth) acrylamide are preferred.

The ratio of the cationic monomer contained in the above-described monomer composition that is a raw material of the cationic organic polymer (B) is 50 mol % or more based on the total number of moles of the monomers contained in the monomer composition, and from the viewpoint of the anti-blocking property of a water-absorbent resin, it is preferably 60 mol % or more.

The cationic organic polymer (B) can be obtained by polymerizing a monomer composition comprising a cationic monomer having an amino group (am) and/or a cationic monomer having a salt of an amino group by a conventional polymerization method, and also can be obtained as a polymer flocculant and a dye fixing agent from the market.

Examples of conventional methods for polymerizing a monomer composition comprising a cationic monomer include an emulsion polymerization method, a suspension polymerization method, and a solution polymerization method each using an organic solvent and/or water; especially, in the case of an aqueous solution polymerization method, there is included a method in which an aqueous solution of a monomer composition usually having a monomer concentration of 10 to 80% by weight is subjected to polymerization under an inert gas atmosphere at about 20 to 100° C. for a several hours with the addition of a conventional polymerization catalyst {e.g., a persulfuric acid salt, such as ammonium persulfate and potassium persulfate; organic peroxides such as benzoyl peroxide; azo-based compounds such as 2,2'-azobis(amidinopropane) hydrochloride and azobiscyanovaleric acid; redox catalysts (combinations of peroxides, such as $H_2O_2$ and potassium persulfate, and reducing agents, such as sodium bisulfite and ferrous sulfate)}.

When the above-described monomer composition contains a cationic monomer having an amino group (am) as the cationic monomer, the cationic organic polymer (B) can be obtained in the form of a salt of a polymer resulting from the polymerization of the monomer composition by neutralizing the polymer with the above-mentioned Lewis acid or the above-mentioned Brønsted acid.

The neutralization with a Lewis acid or a Brønsted acid can be performed by mixing the polymer prepared by polymerizing the monomer composition by the above-described method with an acid by a conventional method, and the mixing of the polymer with the acid is preferably performed in an aqueous solution containing the polymer.

The cationic organic polymer (B) preferably has a structural unit represented by the following formula (1).

[Chemical Formula 1]

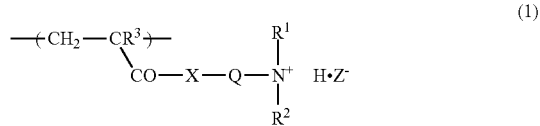

(1)

In the formula (1), $R^1$ and $R^2$ are each a hydrogen atom or an alkyl groups having 1 to 4 carbon atoms, examples of which include a methyl group, an ethyl group, a propyl group, a butyl group, and a tert-butyl group; from the viewpoint of absorption performance, etc., a hydrogen atom or a methyl group is preferred. $R^3$ is a hydrogen atom or a methyl group, and a methyl group is preferred from the viewpoint of the polymerizability of a monomer composition, etc.

Q is an alkylene group having 1 to 4 carbon atoms, examples of which include a methylene group, an ethylene group, a 1,2-propylene group, a 1,3-propylene group, and a 1,4-butylene, and an ethylene group is preferred from the viewpoint of the polymerizability of a monomer composition, etc.

X is an oxygen atom or an imino group, and preferably is an oxygen atom.

$Z^-$ represents a conjugate base of a Brønsted acid, and examples of the Brønsted acid include those enumerated as examples of the above-described Brønsted acid, and preferred examples are also the same.

The structural unit represented by the formula (1) is a constitutional unit derived from at least one cationic monomer selected from the group consisting of the above-described aminoalkyl(having 1 to 4 carbon atoms) (meth) acrylates, alkyl (having 1 to 4 carbon atoms) aminoalkyl (having 1 to 4 carbon atoms) (meth)acrylates, di-alkyl (having 1 to 4 carbon atoms)aminoalkyl(having 1 to 4 carbon atoms) (meth)acrylates, aminoalkyl(having 1 to 4 carbon atoms) (meth)acrylamides, alkyl (having 1 to 4 carbon atoms) aminoalkyl (having 1 to 4 carbon atoms) (meth)acrylamides, and di-alkyl(having 1 to 4 carbon atoms) aminoalkyl(having 1 to 4 carbon atoms) (meth)acrylamides.

The cationic organic polymer (B) having a structural unit represented by the formula (1) can be obtained by a method of polymerizing a monomer composition comprising at least one cationic monomer selected from the group consisting of the above-described aminoalkyl(having 1 to 4 carbon atoms) (meth)acrylates, alkyl(having 1 to 4 carbon atoms)aminoalkyl(having 1 to 4 carbon atoms) (meth)acrylates, di-alkyl (having 1 to 4 carbon atoms)aminoalkyl(having 1 to 4 carbon atoms) (meth)acrylates, aminoalkyl(having 1 to 4 carbon atoms) (meth)acrylamides, alkyl(having 1 to 4 carbon atoms) aminoalkyl (having 1 to 4 carbon atoms) (meth) acrylamides, and di-alkyl(having 1 to 4 carbon atoms) aminoalkyl(having 1 to 4 carbon atoms) (meth)acrylamides; a method of polymerizing a monomer composition comprising a neutralized salt of at least one cationic monomer selected from the group consisting of the above-described aminoalkyl(having 1 to 4 carbon atoms) (meth)acrylates, alkyl(having 1 to 4 carbon atoms)aminoalkyl(having 1 to 4 carbon atoms) (meth)acrylates, di-alkyl(having 1 to 4 carbon atoms)aminoalkyl(having 1 to 4 carbon atoms) (meth)acrylates, aminoalkyl(having 1 to 4 carbon atoms) (meth)acrylamides, alkyl(having 1 to 4 carbon atoms) aminoalkyl (having 1 to 4 carbon atoms) (meth)acrylamides, and di-alkyl(having 1 to 4 carbon atoms)aminoalkyl(having 1 to 4 carbon atoms) (meth)acrylamides with a Brønsted acid; a method of neutralizing a polymer obtained by polymerizing a monomer composition comprising at least one cationic monomer selected from the group consisting of the above-described aminoalkyl(having 1 to 4 carbon atoms) (meth) acrylates, alkyl (having 1 to 4 carbon atoms) aminoalkyl (having 1 to 4 carbon atoms) (meth)acrylates, di-alkyl (having 1 to 4 carbon atoms)aminoalkyl(having 1 to 4 carbon atoms) (meth)acrylates, aminoalkyl(having 1 to 4 carbon atoms) (meth)acrylamides, alkyl (having 1 to 4 carbon atoms) aminoalkyl (having 1 to 4 carbon atoms) (meth)acrylamides, and di-alkyl(having 1 to 4 carbon atoms) aminoalkyl (having 1 to 4 carbon atoms) (meth)acrylamides, with a Brønsted acid; or the like.

The number average molecular weight of the cationic organic polymers (B) is preferably 10,000 or more, more preferably 20,000 to 10,000,000, still more preferably 30,000 to 5,000,000, even more preferably 50,000 to 900,000, and most preferably 100,000 to 800,000. It is undesirable that the number average molecular weight is smaller than 10,000 because, if so, the liquid permeability of a water-absorbent resin composition and the blocking property of gel will be deteriorated. The number average molecular weight of a cationic organic polymer (B) is measured, for example, by using a gel permeation chromatography (1200 Series, manufactured by Agilent Technologies, Ltd.) equipped with a multi angle light scattering detector (DAWN HELEOS II, manufactured by Shoko Scientific Co., Ltd.) (hereinafter abbreviated as GPC-MALS), using an aqueous solution containing 0.5 M acetic acid and 0.2 M sodium nitrate as a solvent, adjusting the sample concentration to 0.2% by weight, using a polymer-based filler (OHpak SB-806M HQ produced by Shoko Scientific Co., Ltd.) as a column stationary phase, and adjusting the column temperature to 40° C. This measurement condition is mentioned as an example and the condition to be adopted is not limited to this.

The water-absorbent resin of the second present invention can be obtained by mixing the crosslinked polymer (A) with the cationic organic polymer (B). Examples of the method for the mixing include a method of uniformly mixing by use of a conventional mixing apparatus, such as a cylindrical mixer, a screw type mixer, a screw type extruder, a Turbulizer, a Nauter mixer, a double-arm kneader, a fluidization mixer, a V-type mixer, a mincing mixer, a ribbon mixer, a fluidization mixer, an air mixer, a rotating disc mixer, a conical blender, and a roll mixer.

In mixing the crosslinked polymer (A) with the cationic organic polymer (B), it is preferred to add the cationic organic polymer (B) under stirring the crosslinked polymer (A). The cationic organic polymer (B) to be added may be added simultaneously with water and/or a solvent. When adding the cationic organic polymer (B) simultaneously with water and/or a solvent, it is permitted to add a solution in which the cationic organic polymer (B) is dissolved in water and/or a solvent or a dispersion in which the cationic organic polymer (B) is dispersed in water and/or a solvent, and it is preferred, from the viewpoint of workability, etc., to add a solution, and it is more preferred to add an aqueous solution. When adding a solution or a dispersion, it is preferred to add it by spraying or dropping.

In the case of using an aqueous solution in which the cationic organic polymer (B) is dissolved in water, the content of the cationic organic polymer (B) contained in the aqueous solution is preferably 5 to 70% by weight based on the total weight of the aqueous solution, and more preferably 10 to 60% by weight.

As the aqueous solution in which the cationic organic polymer (B) is dissolved in water, an aqueous solution obtained after polymerizing the above-described monomer composition in water may be used, or alternatively, an aqueous solution obtained by dissolving the cationic organic polymer (B) in water by such a method as a method of dissolving the polymer using a mixing vessel equipped with an impeller type stirring device may be used.

The aqueous solution may contain an arbitrary additive such as a stabilizer according to need. Examples of the stabilizer include commercially available chelating agents [diethylenetriamine (salt), triethylenetetramine (salt), ethylenediaminetetraacetic acid (salt), citric acid (salt), tartaric acid (salt), malic acid (salt), etc.], commercially available inorganic reducing agents [sulfurous acid (salt), hydrogensulfurous acid (salt), phosphorous acid (salt), hypophosphorous acid (salt), etc.], commercially available pH adjusters [phosphoric acid (salt), boric acid (salt), alkali metal (salt), alkaline earth metal (salt), etc.], and commercially available antioxidants [vitamin C (ascorbic acid), vitamin E (tocopherol), dibutylhydroxytoluene (also called BHT), burylhydroxyanisole (also called BHA), sodium erythorbate, propyl gallate, sodium sulfite, etc.].

The temperature at the mixing of the crosslinked polymer (A) with the cationic organic polymer (B) is not particularly limited and is preferably 10 to 150° C., more preferably 20 to 100° C., and particularly preferably 25 to 80° C.

After mixing the crosslinked polymer (A) with the cationic organic polymer (B), heat treatment may be performed as well. From the viewpoint of the break resistance of resin particles, the heating temperature is preferably 25 to 180° C., more preferably 30 to 175° C., and particularly preferably 35 to 170° C. Heating at 180° C. or lower is advantageous in facility aspect because indirect heating using steam can be employed therefor. Failing to perform heating allows water and a solvent used together to remain superfluously in a water-absorbent resin and may result in deteriorated absorption performance. The amounts of the water and the solvent remaining in the water-absorbent resin are preferably 1 to 10 parts by weight per 100 parts by weight of the water-absorbent resins. The amounts of the water and the solvent remaining in the water-absorbent resin can be determined by a loss-on-heating method according to JIS K0067-1992 (Test methods for loss and residue of chemical products).

In the case of heating after mixing of the crosslinked polymer (A) with the cationic organic polymer (B), the heating time can appropriately be set depending on the heating temperature, and from the viewpoint of absorption performance, it is preferably 5 to 60 minutes, and more preferably 10 to 40 minutes. The water-absorbent resin obtained by mixing the crosslinked polymer (A) with the cationic organic polymer (B) can be surface-treated as well using a cationic organic polymer of the same type as or a different type from the type of the cationic organic polymer used first.

The water-absorbent resin composition of the second present invention may be used after adjusting the particle size thereof by sieving after mixing the crosslinked polymer (A) with the cationic organic polymer (B). The average particle diameter of the particles obtained through particle size adjustment is preferably 100 to 600 μm, and more preferably 200 to 500 μm. The content of fine particles is preferred to be as small as possible; the content of particle being equal to or smaller than 100 μm is preferably 3% by weight or less, and it is more preferred that the content of particles being equal to or smaller than 150 μm be 3% by weight or less.

In the water-absorbent resin composition of the second present invention, the content of the cationic organic polymer (B) can be adjusted according to the application of the water-absorbent resin composition, and the content of the cationic organic polymer (B) contained in the water-absorbent resin composition of the present invention is preferably 0.01 to 5% by weight based on the total weight of the crosslinked polymer (A) and the cationic organic polymer (B), and more preferably 0.1 to 3% by weight. It is preferred that the content be within this range because, if so, the liquid permeability of a water-absorbent resin composition and the anti-blocking property of gel become good.

The water-absorbent resin composition of the second present invention comprise the crosslinked polymer (A) and the cationic organic polymer (B) and may further comprise a multivalent metal salt (e). Inclusion of the multivalent metal salt (e) improves the anti-blocking property and the liquid permeability of a water-absorbent resin composition. Examples of the multivalent metal salt (e) include salts of at least one metal selected from the group consisting of magnesium, calcium, zirconium, aluminum, and titanium with the above-mentioned inorganic acids or organic acids. Preferred examples of the multivalent metal salt (e) are the same as those of the first present invention, and the amount of the salt used is also the same. The method of mixing the crosslinked polymer (A) with the cationic organic polymer (B) and the multivalent metal salt (e) is the same as that of the first present invention using a cationic organic polymer (c), and the mixing method and the particle size adjustment of the multivalent metal salt (e) are also the same as those of the first present invention.

The water-absorbent resin composition of the second present invention may further comprise water-insoluble inorganic particles (f). By comprising the water-insoluble inorganic particles (f), the surface of the particles contained in the water-absorbent resin composition being surface-treated with the water-insoluble inorganic particles (f), and, as a result, the anti-blocking property and the liquid permeability of the water-absorbent resin composition are improved. Preferred example of the water-insoluble inorganic particles (f) and the use amount thereof are the same as those of the first present invention. The method of mixing the water-absorbent resin composition with the water-insoluble inorganic particles (f) and the particle size adjustment are also the same as those of the first present invention.

The water-absorbent resin composition of the second present invention may contain an additive according to need, and examples thereof and the content thereof are the same as those of the first present invention.

The production method of the second present invention comprises a step of mixing the crosslinked polymer (A) with an aqueous solution of a cationic organic polymer (B'). As the cationic organic polymer (B'), there can be preferably used a cationic organic polymer (B') having a cationic group that is a salt of at least one amino group (am) selected from the group consisting of a —$NH_2$ group, a mono-alkyl(having 1 to 4 carbon atoms)-substituted —$NH_2$ group, and a di-alkyl(having 1 to 4 carbon atoms)-substituted —$NH_2$ group, and having been produced through a production process comprising a step of polymerizing a monomer composition comprising, as essential constituents, a cationic monomer having the amino group (am) and/or a cationic monomer having a salt of the amino group (am), wherein the ratio of the cationic monomer contained in the monomer composition is 50 mol % or more based on the total number of moles of the monomers contained in the monomer composition.

When the cationic monomer contains the amino group (am), the cationic organic polymer (B') may comprise a step of further neutralizing a polymer obtained by polymerizing a monomer composition comprising the cationic monomer with a Brønsted acid in order to form a salt of the amino group (am), and a salt of the polymer is obtained in this step. This neutralization step may be the same as the step described above. The cationic organic polymer (B') may be the same as the cationic organic polymer (B) described above, and preferred examples thereof also may be the same.

The step of mixing the crosslinked polymer (A) with the aqueous solution of the cationic organic polymer (B') can be performed by mixing the crosslinked polymer (A) with the aqueous solution of the cationic organic polymer (B') by using the above-mentioned conventional mixing apparatus. The temperature at the mixing is preferably 10 to 150° C., more preferably 20 to 100° C., and particularly preferably 25 to 80° C. By forming an aqueous solution of the cationic organic polymer (B'), it is possible to reduce volatile organic substances contained in a water-absorbent resin composition, and it is possible to mix the crosslinked polymer (A) with the cationic organic polymer (B') uniformly, resulting in stabilized quality.

The apparent density (g/ml) of the water-absorbent resin composition obtained by the production method of the second present invention is the same as that of the water-absorbent resin composition obtained by the production method of the first present invention, and its preferable range is also the same.

EXAMPLES

The present invention is further described below by means of Examples and Comparative Examples, but the present invention is not limited thereto. Hereafter, unless otherwise stated, "part(s)" means "part(s) by weight" and "%" means "% by weight." The water retention capacity relative to physiological saline, the amount of absorption under load, the gel liquid permeation ratio, the hygroscopic blocking property, the whiteness, and the odor of a water-absorbent resin were measured by the methods described below.

<Method for Measuring Water Retention Capacity>

1.00 g of a measurement sample was put into a tea bag (20 cm long, 10 cm wide) made of nylon net with an opening size of 63 μm (JIS Z8801-1:2006) and then was immersed in 1,000 ml of physiological saline (salt concentration: 0.9%) for 1 hour without stirring, followed by pulling up and draining off water by hanging the sample for 15 minutes. Then, the sample in the tea bag was put in a centrifuge and centrifugally dewatered at 150 G for 90 seconds, thereby removing excess physiological saline. Subsequently, the weight (h1) of the sample including the tea bag was measured and then a water retention capacity was calculated from the following formula. The temperature of the physiological saline used and that of the measurement atmosphere were 25° C.±2° C. (h2) is the weight of the tea bag measured with no measurement sample by analogous procedures to those described above.

$$\text{Water retention capacity (g/g)}=(h1)-(h2)$$

<Method for Measuring the Amount of Absorption Under Load>

Into a cylindrical plastic tube (inner diameter: 25 mm, height: 34 mm) with a nylon net having a mesh size of 63 μm (JIS Z8801-1:2006) attached to the bottom of the tube, there was weighed 0.16 g of a measurement sample sieved into a range of 250 to 500 μm using a 30 mesh sieve and a 60 mesh sieve, and then the cylindrical plastic tube was made to stand vertically and the measurement sample was leveled to have an almost uniform thickness on the nylon net and then a weight (weight: 300 g, outer diameter: 24.5 mm) was put on the measurement sample. The weight (M1) of the cylindrical plastic tube as the whole was measured, and then the cylindrical plastic tube containing the measurement sample and the weight was made to stand in a petri dish (diameter: 12 cm) containing 60 ml of physiological saline (salt concentration: 0.9%) and was immersed with the nylon net facing down and was left standing for 60 minutes. After a lapse of 60 minutes, the cylindrical plastic tube was pulled up from the petri dish and then was inclined to collect the water attaching to the bottom of the tube to drip in the form of water drops, thereby removing excess water. Then, the weight (M2) of the cylindrical plastic tube containing the measurement sample and the weight as the whole was measured and then the amount of absorption under load was determined from the following formula. The temperature of the physiological saline used and that of the measurement atmosphere were 25° C.±2° C.

The amount (g/g) of absorption under load={(M2)−(M1)}/0.16

<Method for Measuring Gel Liquid Permeation Rate>

Figure 2:
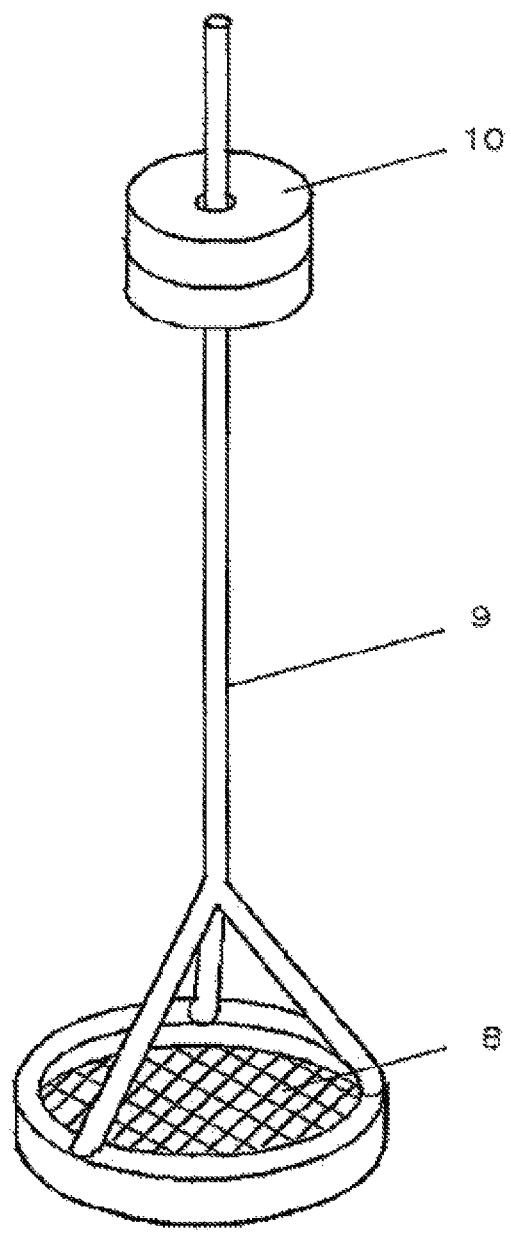
FIG. 2 is a perspective view schematically illustrating a pressing axis and weights for measuring a gel liquid permeation rate.

The gel liquid permeation rate was measured by the following operations using the instruments illustrated in FIG. 1 and FIG. 2.

Swollen gel particles 2 were prepared by immersing 0.32 g of a measurement sample in 150 ml of physiological saline 1 (salt concentration: 0.9%) for 30 minutes. Then, into a filtration cylinder equipped with a wire gauze 6 (mesh size: 106 μm, JIS Z8801-1:2006) and a freely openable and closable cock 7 (inner diameter of the liquid passing portion: 5 mm) at the bottom of a vertically standing cylinder 3 {diameter (inner diameter): 25.4 mm, length: 40 cm; there were graduation lines 4 and 5 at the positions of 60 ml and 40 ml from the bottom, respectively}, the prepared swollen gel particles 2 are transferred together with the physiological saline while closing the cock 7. Then, a pressing axis 9 (weight: 22 g, length: 47 cm) with a circular wire gauze 8 (mesh size: 150 μm, diameter: 25 mm) attached perpendicularly with respect to the wire gauze plane is put on the swollen gel particles 2 in such a manner that the wire gauze comes into contact with the swollen gel particles, and then a weight 10 (88.5 g) is put on the pressing axis 9 and is left standing for 1 minute. Subsequently, the cock 7 was opened and the time (T1; second) taken by the liquid surface in the filtration cylinder to move from the 60 ml graduation line 4 to the 40 ml graduation line 5 was measured, and a gel liquid permeation rate (ml/min) was determined from the following formula. The temperature of the physiological saline and that of the measurement atmosphere were 25° C.±2° C., and T2 is the time measured by the same operation as described above for the case of using no measurement sample.

Gel liquid permeation rate (ml/min)=20 ml×60/(T1−T2)

<Hygroscopic Blocking Ratio>

Into an aluminum dish having a diameter of 5 cm was placed uniformly 10 g of a measurement sample, which are left standing for 3 hours in a thermohygrostat adjusted to 40° C. and a relative humidity of 80%. The water-absorbent resin after being left standing was weighed, and then it was sieved lightly with a 12-mesh wire gauze and the mass of a water-absorbent resin that occurred blocking due to moisture absorption and that did not pass through 12 mesh was measured, and a hygroscopic blocking ratio was calculated from the following formula.

Hygroscopic blocking ratio=(the mass of a water-absorbent resin remaining on 12-mesh wire gauze after being left standing/the mass of a water-absorbent resin after being left standing)×100

<Method for Measuring Whiteness (WB Value)>

The initial coloring (coloring just after production) of a measurement sample and ease of advance of coloring during a long-term storage or in an applied product were evaluated by measuring the whiteness (WB value) before and after an accelerating test using a digital color difference meter (ND-1001DP manufactured by Nippon Denshoku Industries Co., Ltd.). A larger value of whiteness (WB) indicates that coloring is suppressed better. The procedure of the coloring accelerating test is as follows.

Ten grams of a water-absorbent resin was put into a glass petri dish having an inner diameter of 90 mm and was leveled uniformly so that the surface thereof might become flat. The resultant was stored for 14 days in a thermohygrostat conditioned at 60±2° C. and 80±2% R.H. Then, the petri dish was taken out of the thermohygrostat and was cooled to room temperature, and then the whiteness (WB value) after the accelerating test was measured.

<Odor Testing Method>

Twenty grams of a water-absorbent resin was put into a reclosable plastic bag (120 mm×85 mm), and this was hermetically left standing for 12 hours in a thermostat at 40° C. Then, an odor sensory test by 5 adult subjects was performed, and an average score was calculated on the basis of the following criteria.

0: With no unpleasant odor
1: With slight unpleasant odor
2: With unpleasant odor
3: With strong extremely unpleasant odor Production Example 1

270 parts of acrylic acid (a1-1) {produced by Mitsubishi Chemical Corporation, purity: 100%}, 0.98 parts of a cross-linking agent (b-1) {pentaerythritol triallyl ether, produced by Daiso Co., Ltd.}, and 712 parts of ion-exchanged water were kept at 3° C. under stirring and mixing. After adjusting the dissolved oxygen amount to 1 ppm or less by introducing nitrogen into this mixture, 1.1 parts of a 1% aqueous solution of hydrogen peroxide, 2.0 parts of a 2% aqueous solution of ascorbic acid, and 13.5 parts of a 2% aqueous solution of 2,2'-azobisamidinopropane dihydrochloride were added and mixed, so that polymerization was initiated. After the temperature of the mixture reached 80° C., maturation was performed at 80±2° C. for about 5 hours, thereby obtaining hydrous gel.

Then, while chopping the hydrous gel with a mincing machine (12VR-400K, manufactured by ROYAL), 220 parts of a 49% aqueous solution of sodium hydroxide was added and mixed to neutralize, thereby obtaining a neutralized gel. Moreover, the neutralized hydrous gel was through-dried to a water content of 4% under conditions including a supplied air temperature of 150° C. and a wind speed of 1.5 m/sec using a through air dryer (manufactured by Inoue Kinzoku Kogyo Co., Ltd.), and thus a dried material was obtained. The dried material was pulverized with a juicing blender (OSTERIZER BLENDER manufactured by Oster) and then sieved to adjust it into a particle size range of from 710 to 150 μm, thereby obtaining resin particles (A-1) containing a crosslinked polymer.

Subsequently, while stirring 100 parts of the resulting resin particles (A-1) at high speed (by using "High-speed stirring turbulizer" manufactured by Hosokawa Micron Co., rate of revolution: 2000 rpm), a mixed liquid prepared by mixing 0.12 parts of ethylene glycol diglycidyl ether as the surface-crosslinking agent (d) and 1.0 parts of propylene glycol, 1.0 part of Klebosol 30cal25 (colloidal silica produced by AZ Electronic materials Inc.) as the water-insoluble inorganic particles (f), and 1.7 parts of ion-exchanged water, and a mixed liquid prepared by mixing 0.6 parts of sodium aluminum sulfate dodecahydrate as the multivalent metal salt (e), 0.6 parts of propylene glycol, and 1.5 parts of ion-exchanged water were simultaneously added thereto, mixed uniformly, and then heated at 135° C. for 30 minutes, so that surface-crosslinked resin particles (A-2) were obtained.

Production Example 2

While stirring 100 parts of resin particles (A-1) prepared in the same manner as Production Example 1 at high speed (by using "High-speed stirring turbulizer" manufactured by Hosokawa Micron Co., rate of revolution: 2000 rpm), a mixture liquid prepared by mixing 0.12 parts of ethylene glycol diglycidyl ether as the surface-crosslinking agent (d), 1.4 parts of propylene glycol, 1.2 parts of sodium aluminum sulfate dodecahydrate as the multivalent metal salt (e), and 3.9 parts of ion-exchanged water was added thereto, mixed uniformly, and then heated at 135° C. for 30 minutes, so that surface-crosslinked resin particles (A-3) were obtained.

Production Example 3

While stirring 100 parts of resin particles (A-1) prepared in the same manner as Production Example 1 at high speed (by using "High-speed stirring turbulizer" manufactured by Hosokawa Micron Co., rate of revolution: 2000 rpm, a mixture liquid prepared by mixing 0.12 parts of ethylene glycol diglycidyl ether as the surface-crosslinking agent (d), 2.4 parts of propylene glycol, and 3.1 parts of ion-exchanged water was added thereto, mixed uniformly, and then heated at 135° C. for 30 minutes, so that surface-crosslinked resin particles (A-4) were obtained.

Production Example 4

According to a method disclosed in JP-B-54-37986, an in-oil dispersion of the cationic organic polymer (c) was produced. Specifically, 300 g of aminoethyl methacrylate methanesulfonate was dissolved in 200 g of ion-exchanged water, and thus an aqueous monomer solution was prepared. Separately, 430 g of IP solvent (isoparaffin produced by Idemitsu Kosan Co., Ltd.) was put into a 2-L flask and 70 g of polyoxyethylene sorbitan monostearate was dissolved therein, and then the aqueous monomer solution prepared previously was emulsified and dispersed therein while continuing stirring. Nitrogen gas was led to the emulsion for 30 minutes, and 3 mL of a 10% by weight acetone solution of azobisdimethylvaleronitrile (catalyst solution) was added while keeping at 50° C. on a water bath and continuing stirring, and thus polymerization was initiated. Following a four-hour reaction, 3 mL of the catalyst solution mentioned above was added and then was stirred while keeping at 50° C. for additional 2 hours, followed by allowing to cool, and thus an in-oil dispersion of a cationic organic polymer (number average molecular weight: 4,000,000; solid concentration: 30%) was obtained. The in-oil dispersion is named (c-1).

Production Example 5

An in-oil dispersion of a cationic organic polymer (number average molecular weight: 5,000,000; solid concentration: 30%) was obtained by performing the same operations as those of Production Example 4 except changing the aminoethyl methacrylate methanesulfate for aminoethyl methacrylate camphorsulfate. The in-oil dispersion is named (c-2).

Example 1

While stirring 100 parts of the resin particles (A-2) prepared in Production Example 1 at high speed (by using "High-speed stirring turbulizer" manufactured by Hosokawa Micron Co., rate of revolution: 2000 rpm), 2.5 parts of an in-oil dispersion of a dimethylaminoethyl methacrylate methylchloride quaternary salt polymer (produced by MT Aquapolymer, Inc.; number average molecular weight: 2,000,000; solid concentration: about 35%) was added thereto and mixed uniformly. To this was added 0.4 parts of Aerosil 200 (fumed silica produced by NIPPON AEROSIL CO., LTD.) as the water-insoluble inorganic particles (f), followed by mixing for 5 minutes using a Lodige mixer (manufactured by GmbH) and then heating at 80° C. for 30 minutes, and thus a water-absorbent resin composition (P-1) of the first present invention was obtained.

Example 2

A water-absorbent resin composition (P-2) of the first present invention was obtained by performing the same operations as those of Example 1 except changing the use amount of the in-oil dispersion of the dimethylaminoethyl methacrylate methyl chloride quaternary salt polymer from 2.5 parts to 1.2 parts and the use amount of Aerosil 200 from 0.4 parts to 0.2 parts.

Example 3

A water-absorbent resin composition (P-3) of the first present invention was obtained by performing the same operations as those of Example 1 except changing the use amount of the in-oil dispersion of the dimethylaminoethyl methacrylate methyl chloride quaternary salt polymer from 2.5 parts to 1.2 parts and failing to use Aerosil 200.

Example 4

A water-absorbent resin composition (P-4) of the first present invention was obtained by performing the same operations as those of Example 1 except changing the resin particles (A-2) to resin particles (A-3).

Example 5

A water-absorbent resin composition (P-5) of the first present invention was obtained by performing the same operations as those of Example 1 except changing the resin particles (A-2) to resin particles (A-4) and the use amount of Aerosil 200 from 0.4 parts to 0.3 parts.

Example 6

A 3.0-parts fraction taken by well-grinding a powdered dimethylaminoethyl methacrylate methyl chloride quaternary salt polymer (produced by MT Aquapolymer, Inc.; number average molecular weight: 10,000,000) with a mortar, followed by sieving into a particle size of 150 µm or less using a 100-mesh sieve, was added to 100 parts of the resin particles (B-2) obtained in Production Example 1, followed by mixing for 5 minutes using a Lodige mixer (manufactured by GmbH). Moreover, 0.4 parts of Aerosil 200 (fumed silica produced by NIPPON AEROSIL CO., LTD.) as the water-insoluble inorganic particles (f) was added, followed by mixing for 5 minutes using a Lodige mixer (manufactured by GmbH) and then heating at 80° C. for 30 minutes, and thus a water-absorbent resin composition (P-6) of the first present invention was obtained.

Example 7

A water-absorbent resin composition (P-7) of the first present invention was obtained by performing the same operations as those of Example 1 except changing the in-oil dispersion of the dimethylaminoethyl methacrylate methyl chloride quaternary salt polymer to an in-oil dispersion of an acrylamide-dimethylaminoethyl acrylate methyl chloride quaternary salt copolymer (produced by MT Aquapolymer, Inc.; number average molecular weight: 1,000,000, solid concentration: about 35%).

Example 8

A water-absorbent resin composition (P-8) of the first present invention was obtained by performing the same operations as those of Example 1 except changing 2.5 parts of the in-oil dispersion of the dimethylaminoethyl methacrylate methyl chloride quaternary salt polymer to 0.3 parts of the in-oil dispersion of the acrylamide-dimethylaminoethyl acrylate methyl chloride quaternary salt copolymer used in Example 7 and changing the use amount of Aerosil 200 from 0.4 parts to 0.2 parts.

Example 9

A water-absorbent resin composition (P-9) of the first present invention was obtained by performing the same operations as those of Example 1 except changing the resin particles (A-2) to resin particles (A-4), the in-oil dispersion of the dimethylaminoethyl methacrylate methyl chloride quaternary salt polymer (produced by MT Aquapolymer, Inc.; number average molecular weight: 2,000,000, solid concentration: about 35%) to the in-oil dispersion of the acrylamide-dimethylaminoethyl acrylate methyl chloride quaternary salt copolymer used in Example 7, and the use amount of Aerosil 200 from 0.4 parts to 0.3 parts.

Example 10

A water-absorbent resin composition (P-10) of the first present invention was obtained by performing the same operations as those of Example 6 except changing the powdered dimethylaminoethyl methacrylate methyl chloride quaternary salt polymer to a powdered acrylamide-dimethylaminoethyl acrylate methyl chloride quaternary salt copolymer (produced by MT Aquapolymer, Inc.; molecular weight: 3,500,000).

Example 11

A water-absorbent resin composition (P-11) of the first present invention was obtained by performing the same operations as those of Example 1 except changing 2.5 parts of the in-oil dispersion of the dimethylaminoethyl methacrylate methyl chloride quaternary salt polymer to 3.0 parts of the in-oil dispersion of the aminoethyl methacrylate-methanesulfonic acid salt polymer prepared in Production Example 4.

Example 12

A water-absorbent resin composition (P-12) of the first present invention was obtained by performing the same operations as those of Example 1 except changing 2.5 parts of the in-oil dispersion of the dimethylaminoethyl methacrylate methyl chloride quaternary salt polymer to 3.0 parts of the in-oil dispersion of the aminoethyl methacrylate-camphorsulfonic acid salt polymer prepared in Production Example 5.

Comparative Example 1

The resin particles (A-2) obtained in Production Example 1 were taken as received as water-absorbent resin (R-1) for comparison.

Comparative Example 2

To 100 parts of the resin particles (A-2) obtained in Production Example 1 was added 0.4 parts of Aerosil 200 (fumed silica produced by NIPPON AEROSIL CO., LTD.), followed by mixing for 5 minutes using a Lodige mixer (manufactured by GmbH) and then heating at 80° C. for 30 minutes, and thus a water-absorbent resin (R-2) for comparison was obtained.

Comparative Example 3

A water-absorbent resin (R-3) for comparison was obtained by performing the same operations as those of Example 1 except changing 2.5 parts of the in-oil dispersion of the dimethylaminoethyl methacrylate methyl chloride quaternary salt polymer to 4.5 parts of an aqueous solution of polydiallyldimethylammonium chloride (produced by SENKA Corporation; molecular weight: 950,000, solid concentration: 18%).

The performance evaluation results (water retention capacity, the amount of absorption under load, gel liquid permeability, hygroscopic blocking ratio, and whiteness) for the water-absorbent resin compositions (P-1) to (P-12) of Examples 1 to 12 and the water-absorbent resin compositions (R-1) to (R-3) of Comparative Examples 1 to 3 are shown in Table 1.

TABLE 1

| | | Water retention capacity (g/g) | Amount of absorption under load (g/g) | Gel liquid permeation rate (mL/min) | Hygroscopic blocking ratio (%) | Whiteness (WB value) | |
|---|---|---|---|---|---|---|---|
| | | | | | | Initial | After accelerating test |
| Examples | 1: Water-absorbent resin composition (P-1) | 40.3 | 18.3 | 71 | 0.3 | 77 | 59 |
| | 2: Water-absorbent resin composition (P-2) | 40.7 | 18.7 | 54 | 1.8 | 78 | 59 |
| | 3: Water-absorbent resin composition (P-3) | 41.2 | 18.2 | 52 | 9.5 | 77 | 60 |
| | 4: Water-absorbent resin composition (P-4) | 40.4 | 19.2 | 67 | 0.2 | 78 | 60 |
| | 5: Water-absorbent resin composition (P-5) | 40.7 | 19.3 | 34 | 6.7 | 77 | 59 |
| | 6: Water-absorbent resin composition (P-6) | 40.6 | 17.3 | 69 | 12.3 | 78 | 60 |
| | 7: Water-absorbent resin composition (P-7) | 40.7 | 17.9 | 70 | 0.4 | 77 | 60 |
| | 8: Water-absorbent resin composition (P-8) | 40.8 | 18.5 | 35 | 0.6 | 77 | 59 |
| | 9: Water-absorbent resin composition (P-9) | 41.4 | 17.7 | 33 | 11.3 | 79 | 60 |
| | 10: Water-absorbent resin composition (P-10) | 40.9 | 16.4 | 35 | 1.3 | 79 | 60 |
| | 11: Water-absorbent resin composition (P-11) | 40.7 | 18.6 | 65 | 0.9 | 78 | 60 |
| | 12: Water-absorbent resin composition (P-12) | 40.5 | 18.5 | 59 | 1.1 | 79 | 61 |

TABLE 1-continued

| | | Water retention capacity (g/g) | Amount of absorption under load (g/g) | Gel liquid permeation rate (mL/min) | Hygroscopic blocking ratio (%) | Whiteness (WB value) Initial | Whiteness (WB value) After accelerating test |
|---|---|---|---|---|---|---|---|
| Comparative Examples | 1: Comparative water-absorbent resin (R-1) | 41.0 | 21.1 | 4 | 1.5 | 79 | 60 |
| | 2: Comparative water-absorbent resin (R-2) | 40.7 | 18.9 | 15 | 0.2 | 78 | 60 |
| | 3: Comparative water-absorbent resin (R-3) | 40.2 | 12.8 | 21 | 47.8 | 73 | 52 |

The results of Table 1 show that the water-absorbent resin compositions of the first present invention are far improved in gel liquid permeation rate as compared with the water-absorbent resins of Comparative Examples 1 and 2 containing no cationic organic polymer. Moreover, it is shown that as compared with the water-absorbent resin of Comparative Example 3 containing a cationic organic polymer having a low molecular weight, improvement in gel liquid permeation rate is observed and the amount of absorption under load, the hygroscopic blocking ratio, and the whiteness are also remarkably improved. As described above, the water-absorbent resin compositions of the first present invention are found to satisfy a gel liquid permeation rate and other performance at high level.

Production Example 6

Surface-crosslinked resin particles (A-2) were obtained in the same manner as Production Example 1.

Production Example 7

145.4 parts of acrylic acid were diluted with 9.4 parts of water and then were neutralized by the addition of 242.3 parts of 25% aqueous solution of sodium hydroxide under cooling at 30 to 20° C. To this solution, 0.09 parts of ethylene glycol diglycidyl ether, 0.0146 parts of sodium hypophosphite monohydrate, and 0.0727 parts of potassium persulfate were added and dissolved, followed by stirring and dispersing at 25° C. for 2 minutes by using a bio-mixer (ABM-2, manufactured by NIPPON SEIKI CO., LTD.), and thus an aqueous monomer solution was obtained.

Subsequently, a reaction vessel equipped with a stirrer, a reflux condenser, a thermometer, and a nitrogen gas inlet tube was charged with 624 parts of cyclohexane, and 1.56 parts of polyoxyethylene octyl phenyl ether phosphate (produced by DKS Co. Ltd., commercial name: PLYSURF A210G) was added thereto and dissolved, followed by flushing with nitrogen under stirring, and then the temperature was raised to 70° C. While keeping at 70° C., the aqueous monomer solution was added dropwise at a rate of 6.6 parts/minute over 6 minutes, followed by keeping at 75° C. for 15 minutes, and then the remaining aqueous monomer solution was added dropwise at a rate of 6.6 parts/minute over 54 minutes. Then, following maturing at 75° C. for 30 minutes, water was removed by azeotropic distillation with cyclohexane until the water content of the resin became about 20% (measured at 180° C. in 20 minutes using an infrared moisture meter: FD-100, manufactured by Kett Electric Laboratory). Since water-absorbent resin particles that absorbed water sedimented upon cooling down to 30° C. and stopping stirring, the water-absorbent resin particles were separated from the cyclohexane layer by decantation, followed by collecting by filtration and drying under reduced pressure at 80° C., and thus dry particles were obtained. While stirring 100 parts of the dry particles at high speed (by using "High-speed stirring turbulizer" manufactured by Hosokawa Micron Co., rate of revolution: 2000 rpm), a mixture liquid prepared by mixing 0.06 parts of ethylene glycol diglycidyl ether as the surface-crosslinking agent (d), 0.42 parts of methanol and 0.18 parts of ion-exchanged water was added thereto, mixed uniformly, and then heated at 135° C. for 30 minutes, so that surface-crosslinked resin particles (A-6) were obtained.

Production Example 8

A 500-mL separable flask was charged with 50 parts of dimethylaminoethyl methacrylate sulfate, 150 parts of ion-exchanged water, and 0.03 parts of sodium hypophosphite monohydrate, and then was stirred well. While flushing the reaction system with nitrogen by introducing nitrogen into the mixture, 1.5 parts of a 2% aqueous solution of 2,2'-azobisamidinopropane dihydrochloride as an initiator was added, and then a reaction was performed at 75° C. for 5 hours, and thus an aqueous solution (solid concentration: 25%) of a cationic organic polymer (B-1) was obtained. The number average molecular weight of the cationic organic polymer (B-1) contained in the aqueous solution was 400,000.

Production Example 9

An aqueous solution (solid concentration: 25%) of a cationic organic polymer (B-2) was obtained by performing the same operations as those of Production Example 8 except changing the use amount of sodium hypophosphite monohydrate from 0.03 parts to 0.4 parts. The number average molecular weight of the cationic organic polymer (B-2) contained in the aqueous solution was 15,000.

Production Example 10

An aqueous solution (solid concentration: 25%) of a cationic organic polymer (B-3) was obtained by performing the same operations as those of Production Example 8 except changing the dimethylaminoethyl methacrylate sulfate to aminoethyl methacrylate methanesulfate. The number average molecular weight of the cationic organic polymer (B-3) contained in the aqueous solution was 500,000.

Production Example 11

An aqueous solution (solid concentration: 25%) of a cationic organic polymer (B-4) was obtained by performing the same operations as those of Production Example 8 except changing the dimethylaminoethyl methacrylate sulfate to aminoethyl methacrylate methanesulfate, and changing the use amount of sodium hypophosphite monohydrate from 0.03 parts to 0.4 parts. The number average molecular weight of the cationic organic polymer (B-4) contained in the aqueous solution was 24,000.

Example 13

While stirring 100 parts of the resin particles (A-2) obtained in Production Example 6 at high speed (by using "High-speed stirring turbulizer" manufactured by Hosokawa Micron Co., rate of revolution: 2000 rpm), 4.0 parts of the aqueous solution of the cationic organic polymer (B-1) prepared in Production Example 8 was added and mixed uniformly. To this was added 0.4 parts of Aerosil 200 (fumed silica produced by NIPPON AEROSIL CO., LTD.) as the water-insoluble inorganic particles (f), followed by mixing for 5 minutes using a Lodige mixer (manufactured by GmbH) and then heating at 80° C. for 30 minutes, and thus a water-absorbent resin composition (P-13) of the second present invention was obtained.

Example 14

A water-absorbent resin composition (P-14) of the second present invention was obtained by performing the same operations as those of Example 13 except changing the use amount of the aqueous solution of the cationic organic polymer (B-1) from 4.0 parts to 2.0 parts and the use amount of Aerosil 200 from 0.4 parts to 0.2 parts.

Example 15

A water-absorbent resin composition (P-15) of the second present invention was obtained by performing the same operations as those of Example 13 except changing the use amount of the aqueous solution of the cationic organic polymer (B-1) from 4.0 parts to 12 parts.

Example 16

A water-absorbent resin composition (P-16) of the second present invention was obtained by performing the same operations as those of Example 13 except the use amount of the aqueous solution of the cationic organic polymer (B-1) from 4.0 parts to 0.4 parts and failing to use Aerosil 200.

Example 17

A water-absorbent resin composition (P-17) of the second present invention was obtained by performing the same operations as those of Example 13 except changing 4.0 parts of the aqueous solution of the cationic organic polymer (B-1) to 4.0 parts of the aqueous solution of the cationic organic polymer (B-2) prepared in Production Example 9.

Example 18

A water-absorbent resin composition (P-18) of the second present invention was obtained by performing the same operations as those of Example 13 except changing 4.0 parts of the aqueous solution of the cationic organic polymer (B-1) to 4.0 parts of the aqueous solution of the cationic organic polymer (B-3) prepared in Production Example 10.

Example 19

A water-absorbent resin composition (P-19) of the second present invention was obtained by performing the same operations as those of Example 13 except changing 4.0 parts of the aqueous solution of the cationic organic polymer (B-1) to 2.0 parts of the aqueous solution of the cationic organic polymer (B-3) prepared in Production Example 10 and changing the use amount of Aerosil 200 from 0.4 parts to 0.2 parts.

Example 20

A water-absorbent resin composition (P-20) of the second present invention was obtained by performing the same operations as those of Example 13 except changing 4.0 parts of the aqueous solution of the cationic organic polymer (B-1) to 4.0 parts of the aqueous solution of the cationic organic polymer (B-4) prepared in Production Example 11.

Example 21

While stirring 100 parts of the resin particles (A-6) obtained in Production Example 7 at high speed (by using "High-speed stirring turbulizer" manufactured by Hosokawa Micron Co., rate of revolution: 2000 rpm), 1.2 parts of the aqueous solution of the cationic organic polymer (B-1) prepared in Production Example 8 was added and mixed uniformly. Then, heating was performed at 80° C. for 30 minutes, and thus a water-absorbent resin composition (P-21) of the second present invention was obtained.

Comparative Example 4

The resin particles (A-2) obtained in Production Example 6 were taken as received as water-absorbent resin (R-4) for comparison.

Comparative Example 5

To 100 parts of the resin particles (A-2) obtained in Production Example 6 was added 0.4 parts of Aerosil 200 (fumed silica produced by NIPPON AEROSIL CO., LTD.), followed by mixing for 5 minutes using a Lodige mixer (manufactured by GmbH) and then heating at 80° C. for 30 minutes, and thus a water-absorbent resin (R-5) for comparison was obtained.

Comparative Example 6

A water-absorbent resin (R-6) for comparison was obtained by performing the same operations as those of Example 13 except changing 4.0 parts of the aqueous solution of the dimethylaminoethyl methacrylate sulfate polymer to 4.5 parts of an aqueous solution of polydiallyldimethylammonium chloride (commercial name: UNISENCE FPA1002L, produced by SENKA Corporation; molecular weight: 950,000, solid concentration: 18%).

Comparative Example 7

A water-absorbent resin (R-7) for comparison was obtained by performing the same operations as those of Example 14 except changing 2.0 parts of the aqueous solution of the dimethylaminoethyl methacrylate sulfate polymer to 2.5 parts of dimethylaminoethyl methacrylate dimethylsulfate quaternary salt (commercial name: UNISENCE FPV1000L, produced by SENKA Corporation; molecular weight: 400,000, solid concentration: 20%).

The performance evaluation results (water retention capacity, the amount of absorption under load, gel liquid permeability, hygroscopic blocking ratio, whiteness and odor) for the water-absorbent resin compositions (P-13) to (P-21) of Examples 13 to 21 and the water-absorbent resin compositions (R-4) to (R-7) of Comparative Examples 4 to 7 are shown in Table 2.

TABLE 2

|  |  | Water retention capacity (g/g) | Amount of absorption under load (g/g) | Gel liquid permeation rate (mL/min) | Hygroscopic blocking ratio (%) | Whiteness (WB value) Initial | Whiteness (WB value) After accelerating test | Odor |
|---|---|---|---|---|---|---|---|---|
| Examples | 13: Water-absorbent resin composition (P-13) | 40.5 | 17.8 | 64 | 1.8 | 78 | 59 | 0.6 |
|  | 14: Water-absorbent resin composition (P-14) | 41.1 | 18.3 | 49 | 3.5 | 77 | 59 | 0.4 |
|  | 15: Water-absorbent resin composition (P-15) | 40.1 | 17.2 | 77 | 9.5 | 76 | 57 | 0.8 |
|  | 16: Water-absorbent resin composition (P-16) | 41.2 | 18.6 | 38 | 1.5 | 79 | 60 | 0.4 |
|  | 17: Water-absorbent resin composition (P-17) | 40.7 | 18.4 | 48 | 6.5 | 78 | 59 | 0.6 |
|  | 18: Water-absorbent resin composition (P-18) | 40.6 | 18.2 | 70 | 0.8 | 77 | 58 | 0.4 |
|  | 19: Water-absorbent resin composition (P-19) | 40.9 | 18.9 | 61 | 1.8 | 77 | 58 | 0.4 |
|  | 20: Water-absorbent resin composition (P-20) | 40.7 | 18.5 | 56 | 4.8 | 77 | 59 | 0.6 |
|  | 21: Water-absorbent resin composition (P-21) | 39.0 | 22.5 | 46 | 1.2 | 80 | 62 | 0.6 |
| Comparative Examples | 4: Comparative water-absorbent resin (R-4) | 41.0 | 21.1 | 4 | 1.5 | 79 | 60 | 0.4 |
|  | 5: Comparative water-absorbent resin (R-5) | 40.7 | 18.9 | 15 | 0.2 | 78 | 60 | 0.4 |
|  | 6: Comparative water-absorbent resin (R-6) | 40.2 | 12.8 | 21 | 47.8 | 73 | 52 | 2.2 |
|  | 7: Comparative water-absorbent resin (R-7) | 40.5 | 17.1 | 38 | 9.2 | 74 | 52 | 1.6 |

The results of Table 2 show that the water-absorbent resin compositions of the second present invention are far improved in gel liquid permeation rate as compared with the water-absorbent resins of Comparative Examples 4 and 5 containing no cationic organic polymer, and therefore, the water-absorbent resin compositions of the second present invention are superior in liquid permeability between swollen gels. Moreover, it is shown that as compared with the water-absorbent resins of Comparative Examples 6 and 7 containing cationic organic polymers for comparison, the water-absorbent resin compositions of the second present invention are not only superior in gel liquid permeation rate, but also improved in the amount of absorption under load, hygroscopic blocking ratio, whiteness, and odor. As described above, the water-absorbent resin compositions of the second present invention are found to satisfy a gel liquid permeation rate and other performance at high level.

INDUSTRIAL APPLICABILITY

The water-absorbent resin composition of the first present invention can be compatible with the liquid permeability between swollen gels and the absorption performance under load and has an advantageous feature that it hardly has blocking or discoloration during storage. The water-absorbent resin composition of the second present invention is superior in liquid permeability between swollen gels and has an advantageous feature that it hardly has occurrence of blocking, discoloration, or odor during storage. Since the water-absorbent resin compositions of the present invention exert the effects described above, they can be used by applying them to various types of absorbents to form absorbent articles having large absorption and being superior in rewet performance or surface dry feeling. Accordingly, they are suitably used for sanitary goods, such as disposable diapers (disposable diaper for children, disposable diaper for adults, etc.), napkins (sanitary napkin, etc.), paper towel, pads (incontinence pad, surgical underpad, etc.), and pet sheets (pet urine absorbing sheet), and is best suited for disposable diapers.

DESCRIPTION OF REFERENCE SIGNS

1 Physiological saline
2 Hydrous gel particles
3 Cylinder
4 Graduation line at the position of 60 ml from the bottom
5 Graduation line at the position of 40 ml from the bottom
6 Wire gauze
7 Cock
8 Circular wire gauze
9 Pressing axis
10 Weight

The invention claimed is:

1. A water-absorbent resin composition comprising a crosslinked polymer (A) comprising a water-soluble vinyl monomer (a1) and/or a vinyl monomer (a2) that turns into a water-soluble vinyl monomer (a1) through hydrolysis and a crosslinking agent (b) as constitutional units of the crosslinked polymer (A); and a cationic organic polymer (B), wherein the cationic organic polymer (B) is a polymer or a salt thereof of a monomer composition comprising a cationic monomer having an amino group (am) and/or a cationic monomer having a salt of the amino group (am) as constitutional units of the cationic organic polymer (B), and wherein the ratio of the cationic monomer contained in the monomer composition is 50 mol % or more based on the total number of moles of the monomers contained in the monomer composition, wherein the content of the cationic organic polymer (B) is 0.01 to 3% by weight based on the total weight of the crosslinked polymer (A) and the cationic organic polymer (B), wherein the cationic organic polymer (B) has a structural unit represented by the following formula (1):

[Chemical Formula 1]

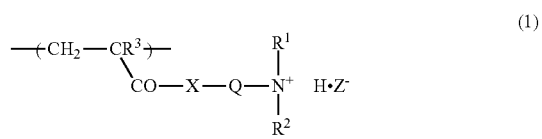

wherein $R^1$ and $R^2$ are each a hydrogen atom or an alkyl group having 1 to 4 carbon atoms, $R^3$ is a hydrogen atom or a methyl group, Q is an alkylene group having 1 to 4 carbon atoms, X is an oxygen atom or an imino group, and $Z^-$ represents a conjugate base of a Brønsted acid.

2. The water-absorbent resin composition according to claim 1, wherein the salt of the amino group (am) is a salt of the amino group (am) and a strong acid having a molecular weight of 30 to 300 and a pKa of 1 or less.

3. The water-absorbent resin composition according to claim 1, wherein the surface of the crosslinked polymer (A) has a structure crosslinked by a surface-crosslinking agent (d).

4. The water-absorbent resin composition according to claim 1, comprising a multivalent metal salt (e).

5. The water-absorbent resin composition according to claim 1, comprising water-insoluble inorganic particles (f).

6. A method for producing a water-absorbent resin composition, comprising a step of mixing a crosslinked polymer (A) comprising a water-soluble vinyl monomer (a1) and/or a vinyl monomer (a2) that turns into a water-soluble vinyl monomer (a1) through hydrolysis, and a crosslinking agent (b) with an in-oil dispersion of a cationic organic polymer (c) having a number average molecular weight of 1,000,000 or more, wherein the cationic organic polymer (c) has a structural unit represented by the following formula (1):

[Chemical Formula 1]

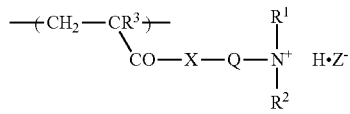

(1)

wherein $R^1$ and $R^2$ are each a hydrogen atom or an alkyl group having 1 to 4 carbon atoms, $R^3$ is a hydrogen atom or a methyl group, Q is an alkylene group having 1 to 4 carbon atoms, X is an oxygen atom or an imino group, and $Z^-$ represents a conjugate base of a Brønsted acid.

7. A method for producing a water-absorbent resin composition, comprising s step of mixing a crosslinked polymer (A) comprising a water-soluble vinyl monomer (a1) and/or a vinyl monomer (a2) that turns a water-soluble vinyl monomer (a1) through hydrolysis, and a crosslinking agent (b) with an aqueous solution of a cationic organic polymer (B'), wherein the cationic organic polymer (B') has a structural unit represented by the following formula (1):

[Chemical Formula 1]

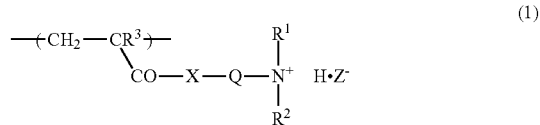

(1)

wherein $R^1$ and $R^2$ are each a hydrogen atom or an alkyl group having 1 to 4 carbon atoms, $R^3$ is a hydrogen atom or a methyl group, Q is an alkylene group having 1 to 4 carbon atoms, X is an oxygen atom or an imino group, and $Z^-$ represents a conjugate base of a Brønsted acid.

8. The production method according to claim 7, wherein the cationic organic polymer (B') is a polymer produced through a production process comprising a step of polymerizing a monomer composition comprising, as essential constituents, a cationic monomer having an amino group (am) and/or a cationic monomer having a salt of the amino group (am); and the ratio of the cationic monomer contained in the monomer composition is 50 mol % or more based on the total number of moles of the monomers contained in the monomer composition.

* * * * *